(12) United States Patent
Maekawa et al.

(10) Patent No.: US 8,228,329 B2
(45) Date of Patent: Jul. 24, 2012

(54) INTERPOLATION PROCESSING METHOD, INTERPOLATION PROCESSING DEVICE, SHAPE EVALUATION METHOD, AND SHAPE EVALUATION DEVICE

(75) Inventors: Takashi Maekawa, Kanagawa (JP); Yasunori Matsumoto, Mie (JP); Ken Namiki, Kanagawa (JP)

(73) Assignee: National University Corporation Yokohama National University, Yokohama (JP)

( * ) Notice: Subject to any disclaimer, the term of this patent is extended or adjusted under 35 U.S.C. 154(b) by 926 days.

(21) Appl. No.: 12/161,930

(22) PCT Filed: Jan. 15, 2007

(86) PCT No.: PCT/JP2007/050433
§ 371 (c)(1),
(2), (4) Date: Nov. 6, 2008

(87) PCT Pub. No.: WO2007/083602
PCT Pub. Date: Jul. 26, 2007

(65) Prior Publication Data
US 2009/0303235 A1 Dec. 10, 2009

(30) Foreign Application Priority Data

Jan. 23, 2006 (JP) ................... 2006-014379

(51) Int. Cl.
*G06T 17/20* (2006.01)
*G06T 15/00* (2011.01)
*G06T 11/20* (2006.01)
*G06K 9/32* (2006.01)

(52) U.S. Cl. ........ 345/423; 382/300; 345/419; 345/442; 345/441

(58) Field of Classification Search ................ 345/423
See application file for complete search history.

(56) References Cited

U.S. PATENT DOCUMENTS
5,410,645 A 4/1995 Ooka et al.
(Continued)

FOREIGN PATENT DOCUMENTS
JP 05-035826 A 2/1993
(Continued)

OTHER PUBLICATIONS

Helmut Pottmann and Stefan Leopoldseder. 2003. A concept for parametric surface fitting which avoids the parametrization problem. Comput. Aided Geom. Des. 20, 6 (Sep. 2003), 343-362.*

(Continued)

*Primary Examiner* — Kee M Tung
*Assistant Examiner* — Zhengxi Liu
(74) *Attorney, Agent, or Firm* — Westerman, Hattori, Daniels & Adrian, LLP

(57) ABSTRACT

An initial polygon obtained from a point group is used as a control polygon, and a control point of the control polygon is offset in a normal direction by the shortest distance from a limit surface generated by the control polygon, so that the position of new control point is determined to allow a subdivision surface to interpolate the initial polygon, thereby generating the subdivision surface which interpolates the point group. A first process to determine the point on the subdivision surface at the shortest distance from each control point, and a second process to move and offset the control point in the normal direction from the surface by the distance between the point on the surface and the initial control point, are iterated until the distance between the initial point group and the point on the surface satisfies the threshold or becomes smaller than the threshold, thereby generating the subdivision surface interpolating the initial polygon. Consequently, the subdivision surface interpolating the point group is generated within a short operation time period, without solving a linear system.

27 Claims, 25 Drawing Sheets

U.S. PATENT DOCUMENTS 5,991,703 A 11/1999 Kase
6,084,586 A 7/2000 Ooka et al.
6,480,615 B1 * 11/2002 Sun et al. ............ 382/103

FOREIGN PATENT DOCUMENTS

JP 11-065628 A 3/1999

OTHER PUBLICATIONS

T. Maekawa, F.-E. Wolter, N. M. Patrikalakis, Umbilics and lines of curvature for shape interrogation, Computer Aided Geometric Design, vol. 13, Issue 2, Mar. 1996, pp. 133-161, ISSN 0167-8396.*

Maekawa et al., "Interpolation by geometric algorithm", Computer-Aided Design 39 (2007) 313-323.*

Lai et al., "Locally Adjustable Interpolation for Meshes of Arbitrary Topology", In Proceedings of the 3rd international conference on Advances in visual computing—vol. Part I (ISVC'07).*

Charles Teorell LOOP; "Smooth Subdivision Surfaces Based on Triangles", Department of Mathematics, The University of Utah, Aug. 1987.

D. Doo et al.; "Behaviour of recursive division surfaces near extraordinary points", IPC Business Press, 1978.

George Merrill Chaikin; "Short Note An Algorithm for High-Speed Curve Generation"; Computer Graphics and Image Processing, 3, pp. 346-349, 1974.

Martin Marinov et al.; "Optimization methods for scattered data approximation with subdivision surfaces"; Graphical Model 67, pp. 452-473, 2005.

Hongwei Lin et al.; "Constructing iterative non-uniform B-spline curve and surface to fit data points"; Sicnece in China Press, vol. 47, No. 3, pp. 315-331, 2004.

International Search Report of PCT/JP2007/050433, date of mailing, Mar. 27, 2007.

Wenping Wang etc., "Fitting B-Spline Curves to Point Clouds by Squared Distance Minimization", Technical report TR-2004-11, Department of Computer Science, The University of Hong Kong, 2004.

Wenping Wang etc., "Fitting B-Spline Curves to Point Clouds by Curvature-Based Squared Distance Minimization", ACM Transaction on Graphics, vol. V, No. N, Month 20YY, pp. 1-0??, ACM Trans. Graph. 25, 2 (Apr. 2006), 214-238.

"10.2 Parabolic Interpolation and Brent's Method in One Dimension"; Chapter 10. Minimizaiton or Maximization of Functions, W. H. Press, S.A. Tevkolsky, W.T. Vetterling, and B.P. Flannery: Numerical Recipes in C. Cambridge University Press, 1998.

E. Catmull et al.; "Recursively generated B-spline surfaces on arbitrary topological meshes", Computer Graphics Laboratory, New York Institute of Technology, P. O Box 170, Old Westbury, New York 11568, USA vol. 10, No. 6, Nov. 1978.

Mark Halstead et al.; "Efficient, Fair Interpolation using Catmull-Clark Surfaces"; Apple Computer, Inc, in Proceedings of SIGGRAPH 1993, pp. 35-44.

Hugues Hoppe et al.; "Piecewise Smooth Surface Reconstruction"; University of Washington, Seatle, WA, In Proceedings of SIGGRAPH 1994, pp. 295-302.

Wenping Wang etc., "Fitting B-Spline Curves to Point Clouds by Curvature-Based Squared Distance Minimization", ACM Transaction on Graphics, vol. 25, No. 2, Apr. 2006, pp. 214-238.

Jos Stam; "Evaluation of Loop Subdivision Surfaces"; Alias/wavefront, Inc., In SIGGRAPH 1999, Course notes, 1999, pp. 1-15.

Jos Stam; "Exact Evaluation of Catmull-Clark Subdivision Surfaces At Arbitrary Parameter Values"; Alias/wavefront, Inc., In Proceedings of SIGGRAPH 1998, pp. 395-404.

* cited by examiner (S4a)

(S4b)

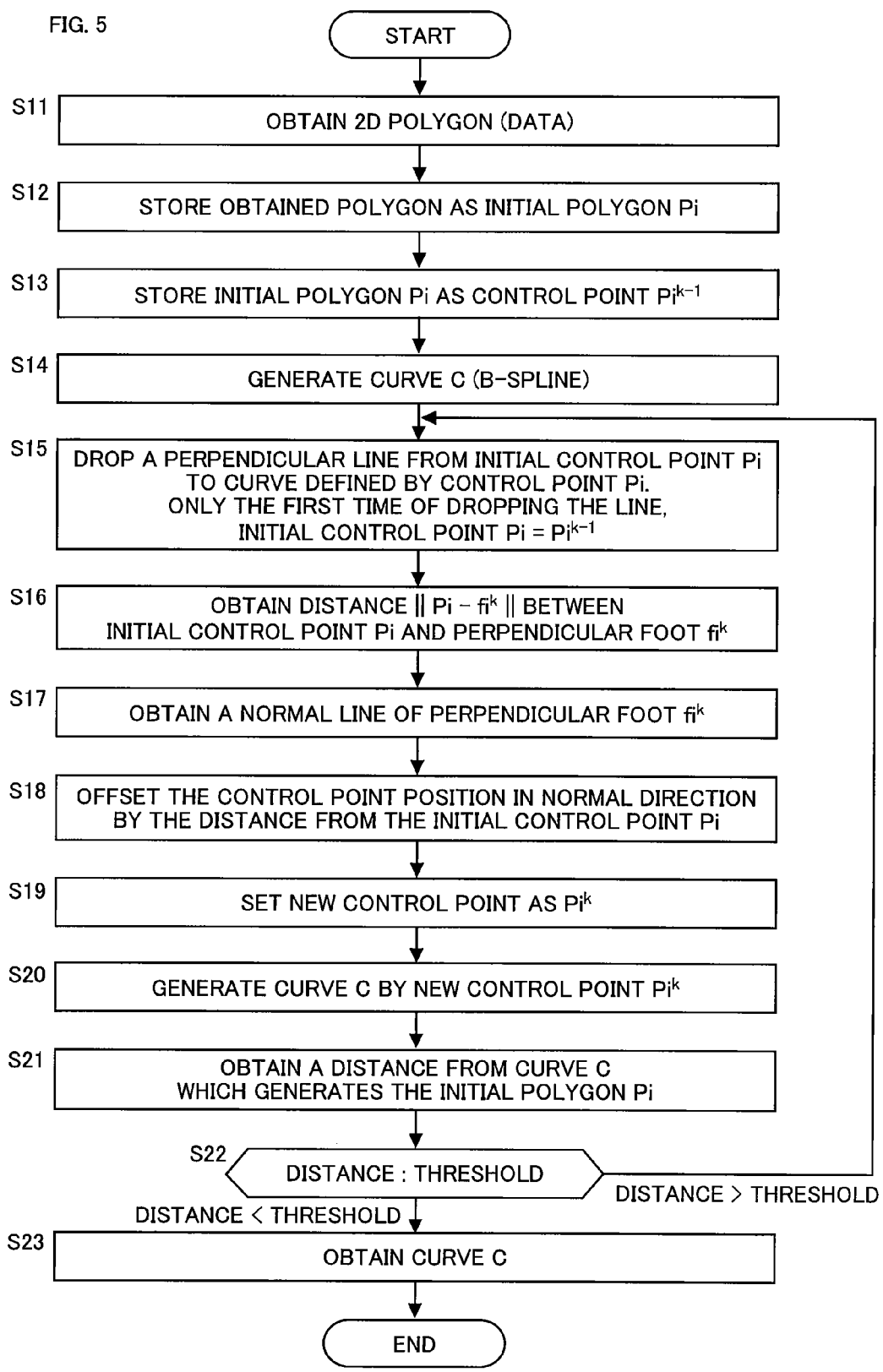

(S11)

(S14)

(S15, 16)

(S17~19)

(S20)

(S15, 16)

(S17-19)

(S20)

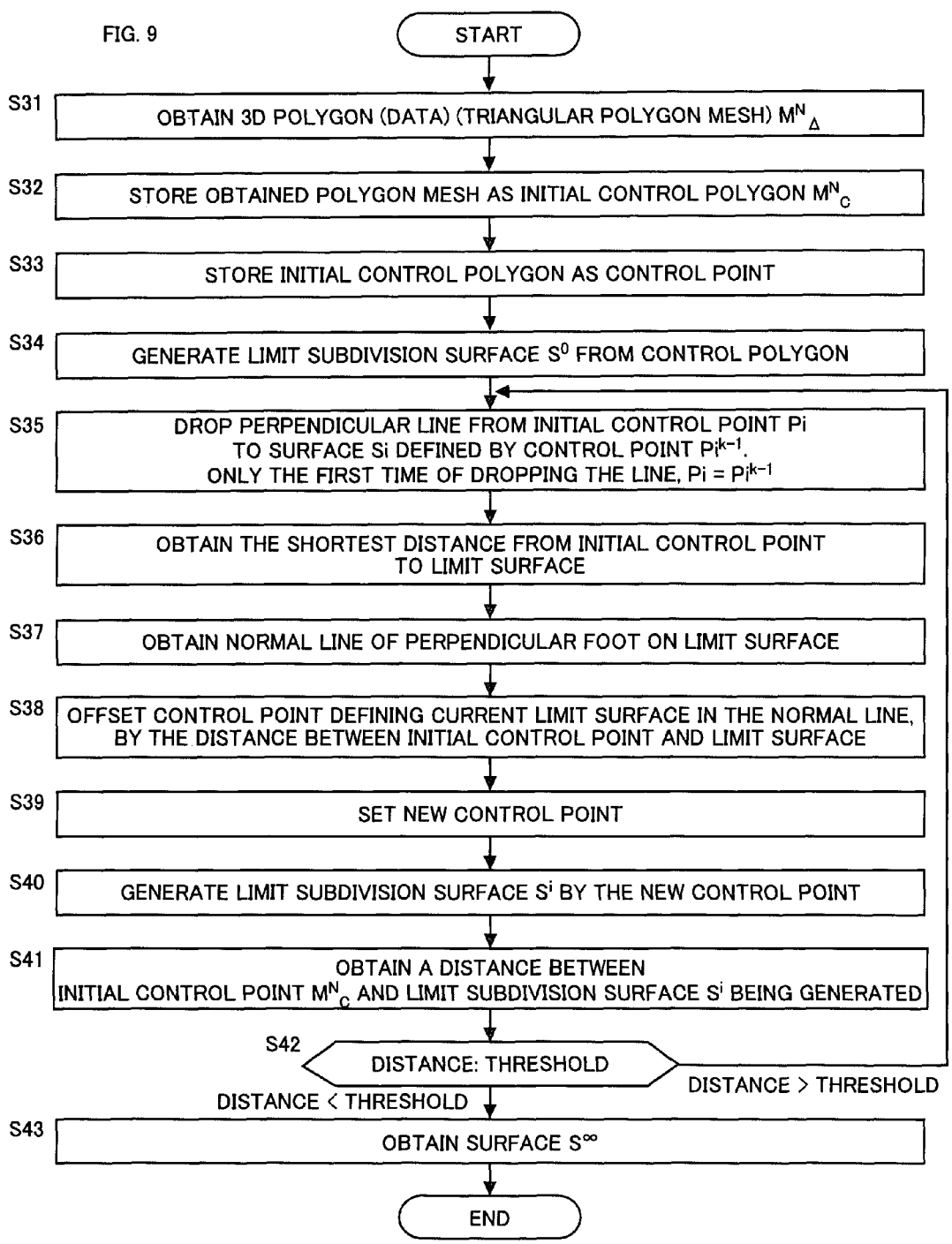

S31~S34

S35~S37

S38, S39

S40

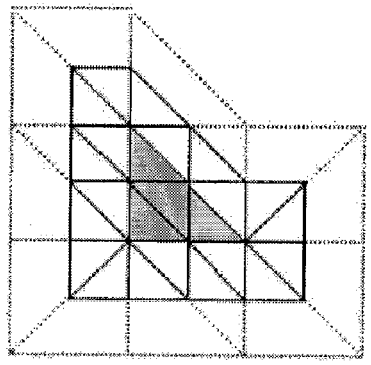
FIG. 11B
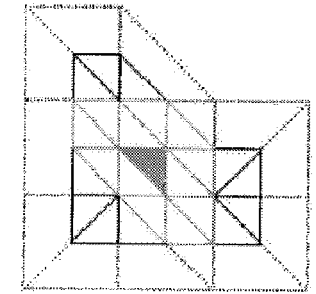
FIG. 11F
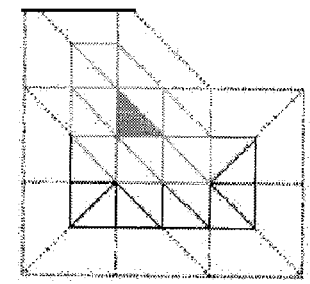
FIG. 11E
FIG. 11A
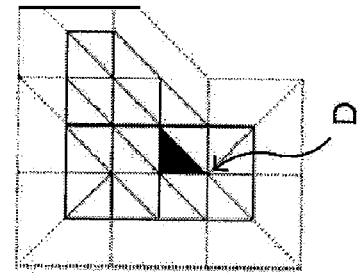
FIG. 11D
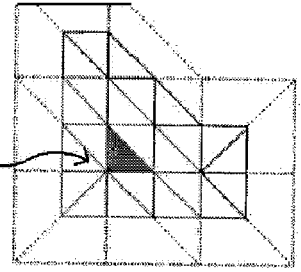
FIG. 11C
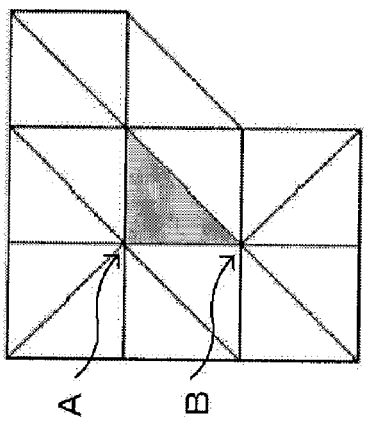

Number of iterations
1st offset iteration

Number of iterations
5th offset iteration

Number of iterations
9th offset iteration

Number of iterations
offset-cost bunny model with 562 verices

Rocker-Arm

Point cloud

Initial mesh overlaid on the Subdivision surface

Subdivision surface

Stanford Bunny

Point cloud

Initial mesh overlaid on the Subdivision surface

Subdivision surface

Happy Buddha

Point cloud

Initial mesh overlaid on the Subdivision surface

Subdivision surface

INTERPOLATION PROCESSING METHOD, INTERPOLATION PROCESSING DEVICE, SHAPE EVALUATION METHOD, AND SHAPE EVALUATION DEVICE

TECHNICAL FIELD

The present invention relates to an interpolation processing method and an interpolation processing device for generating a curve or a surface by interpolating point group data, and a program for allowing a CPU to execute the interpolation processing. More particularly, the present invention further relates to an evaluation method and an evaluation device for evaluating a subdivision surface obtained by the interpolation processing method and a differential geometric shape at a vertex of a polygon mesh, and a program medium which stores a program for allowing the CPU to execute the evaluation.

BACKGROUND ART

A free-form surface is employed in various industrial products, such as a ship, an automobile, and an airplane, and it offers an excellent compromise between functionality and aesthetic merit. Such free-form surface is used in designing appearances, or the like, of home electric appliances and many kinds of consumer products, having an aesthetic shape.

In recent years, a 3D laser scanner allows a high-speed and easy collection of high-density point group data, enabling a highly precise measurement of an object shape. By way of example, in the field of 3D modeling, there is employed a method, so-called "reverse engineering", in which a designer manually creates a mockup model, uses the 3D laser scanner to measure the design, and generates CAD data such as surface data which is necessary for manufacturing a product, based on the point group data and polygon data captured into a computer.

In general, a polygon model or a surface patch such as NURBS and B-Spline represents the 3D model on the computer.

The polygon model is efficient in performing a shape processing such as a topological change. However, since the polygon model is made up of plain surfaces, it is not possible to represent a smooth surface, and there is another problem that if the shape is depicted in more detailed manner, enormous volumes of data are necessary.

As for the surface patch, it is possible to represent a smooth surface by the use of control parameters. However, there are problems that a shape of patch is limited to a quadrilateral, and in addition, it is difficult to maintain continuity between patches. In view of such problems, attention is being given to a subdivision method, as an effective method for a free-form shape modeling, which combines advantages of both the polygon model and the surface patch. This method has already been utilized in the field of animation commonly.

The subdivision method is a method which iteratively subjects an initial polygon mesh to a regular subdivision, thereby making the shape smoother, and ultimately obtaining a smooth surface. This surface is referred to a subdivision surface or a limit surface. The subdivision method has another feature that is able to generate a smooth surface easily even for a model in arbitrary topology. Furthermore, the surface can be defined smoothly in any part, and therefore this method is widely used in modeling, or the like.

In the field of reverse engineering, conventionally, there has been suggested a method for generating a surface by approximating or interpolating point group data which are measured by using the subdivision surfaces. The conventionally suggested method for interpolating the point group data by using the subdivision surfaces performs an operation processing for obtaining control points sequentially, so that a distance error between the initial control point obtained from the point group data and the surface being generated is minimized. The operation processing for obtaining the control point is performed by solving a linear matrix equation expressed by AP=S, where S represents a column of the point group, P represents a column of control points for generating the surface that approximates the point group, and A represents a basis function matrix that defines the surface.

As a conventionally suggested interpolation method, for example, there is known a method for interpolating a polyhedral mesh using Catmull-Clark subdivision surfaces, the method being suggested by Halsted, et al. (Non-patent document 1). The method needs to solve not only a large linear system, but also a minimization problem for surface adjustment, referred to as fairing, resulting in increase of computational cost.

In addition, Hoppe et al. suggests a method for approximating the group point data using Loop subdivision surface. This method assumes a polygon mesh having been subjected to the subdivision operation as subdivision surfaces linearly approximated, and the surfaces are further subjected to an orthogonal projection from each vertex for parameterization. Then, the method suggests handling the case as a least squares problem, aiming at obtaining a minimum distance between each vertex and an associated point on the subdivision surfaces being linearly approximated (Non-patent document 2).

Non-patent document 1: M. Halsted. M. Kass, and T. DeRose. Efficient, fair interpolation using Catmull-Clark surfaces. In Eugene Fiume, editor. In Proceedings of SIGGRAPH 1993, pages 47-61. ACM, ACM Press/ACM SIGGRAPH, 1993

Non-patent document 2: H. Hoppe, T. DeRpse. T. Duchamp, and M. Halsted. Piecewise smooth surface reconstruction. In Proceedings of SIGGRAPH 1994, pages 47-61, ACM, ACM Press/ACM SIGGRAPH, 1994

Non-patent document 3: C. T. Loop. Smooth subdivision surface based on triangle. Masters thesis, Department of Mathematics. University of Uta. 1987/.

Non-patent document 4: E. Catmull and J. Clark. Recursively generated b-spline surfaces on arbitrary topological meshes. Computer-Aided Design, 10(6): 350-355, 1987.

Non-patent document 5: D. Doo and M. Sabin. Behavior of recursive division surfaces near extraordinary points. Computer-Aided Design, 10(6): 356-360, 1978.

Non-patent document 6: G. M. Chaikin. An algorithm for high-speed curve generation. Computer Graphics and Image Processing, 3: 346-349, 1974.

Non-patent document 7: J. Stam. Exact evaluation of Catmull-Clark subdivision surfaces at arbitrary parameter values. In Proceedings of SIGGRAPH on 1998, pages 395-404. AVM, ACM Press/ACM SIGGRAPH, 1998.

Non-patent document 8: M. Marinov and L. Kobbelt, Optimization methods for scattered data approximation with subdivision surface, Graphical Models 67, 2005, 452-473.

Non-patent document 9: R. P. Brent. Algorithms for Minimization without Derivatives. Prentice-Hall, Englewood Cliffs, N.J., 1986. 4.

DISCLOSURE OF THE INVENTION

Problems to be Solved by the Invention

The operation used in the conventionally suggested methods for interpolating the point group data by using the subdivision surface is a solution of linear system. Therefore, due to characteristics of the operation, as the number of the point groups and the number of the control points increase, the number of operation times increases. In general, the number of the point groups required for a 3D model, and the number of control points formed from the point groups are quite large. Therefore, the operation for generating the surfaces from the point group results in a computation for solving a large-scale linear system, causing a problem that enormously long computational time is needed so as to obtain a desired smooth surface.

In addition, in order to obtain the smooth surface, it is necessary to iterate the operation processing to solve the large-scale linear system, until a parameter difference between the initial control point and the generated surface is minimized, causing that an enormously long time is needed to obtain the desired smooth surface.

There is another problem that the interpolation processing may generate an undesired undulation in a correction result. In order to solve this undulation, the non-patent document 1 performs a surface adjustment processing, referred to as fairing. As thus described, in the conventional interpolation processing, the surface adjustment processing is necessary in addition to the interpolation processing, causing a problem that processing steps are increased.

In view of the problems above, in the processing for interpolating the point group, it is requested to obtain an interpolation result with little undulation, neither requiring enormous amount of operation processing nor increasing the processing steps.

Currently, in the fields of CAD/CAM, computer graphics (CG), and the like, there is widely used a method that depicts a smooth surface in a form of polygon mesh. There is an advantage that approximation of the surface to the polygon mesh facilitates the processing on a computer, and in addition, such mesh can be applied to FEM. However, the polygon mesh is a model represented by linearly interpolating point group, and therefore, unlike B-Spline or the like, it is not possible to evaluate the shape analytically by using a differential geometry.

An object of the present invention is to solve the conventional problems as described above, and obtain an interpolation result with little undulation, neither requiring enormous amount of operation processing, nor increasing the processing steps, in the processing for interpolating the point group.

Another object of the present invention is to obtain an interpolation result with little undulation within a short operation time, in generating subdivision surfaces for interpolating the point group.

An alternative object of the present invention is to suggest a method and a device for generating the subdivision surface for interpolating the point group without solving a linear system.

A further alternative object of the present invention is to analytically evaluate a differential geometric shape on each vertex of the polygon mesh.

Means to Solve the Problems

The present invention assumes an initial polygon obtained from a point group as a control polygon, offsets a control point of the control polygon in a normal direction by the shortest distance between a limit surface generated by the control polygon and an initial control polygon being an interpolation point, so as to obtain a position of new control point for allowing the subdivision surface to interpolate the initial polygon, thereby generating a subdivision surface for interpolating the point group, and iterates until a distance between the initial point group and the point on the surface satisfies or becomes smaller than a threshold, a first step for obtaining the point on the subdivision surface located at the shortest distance from each initial control point and a second step for performing an offset by shifting the control point in the normal direction from the surface, by a distance between the point on the surface and the initial control point.

It is to be noted that in the present invention, a control polygon constituted from the polygon data $M^N_A$ being input is assumed as an initial control polygon $M^N_C$, and a polygon constituted from the control point being offset is simply referred to as a control polygon. The control point of the initial control polygon is also referred to as an interpolation point.

The method according to the present invention treats each control point locally, and therefore, it does not need a linear system, and further, an interpolation surface is able to be generated just by a geometric process. Therefore, compared to a conventional method, it is possible to generate an interpolation surface at a higher speed. In addition, since such operation above enlarges the control polygon, while keeping the polygon in initial, topology achieving a more intuitive method relative to a conventional method which needs to solve a linear system. Therefore, there is less chance that a surface being generated has undulations, and a highly qualified surface can be obtained.

The present invention is applicable, not only to a three-dimensional example but also to a two-dimensional example in the similar manner, and also applicable to generation of a subdivision surface for correcting three-dimensional point group, as well as applicable to generation of a curve for interpolating a two-dimensional point group.

The present invention may be directed to each of the following aspects, including a method and a device regarding an interpolation processing, and a program medium which stores programs for allowing a computer to execute the interpolation processing.

Here, the interpolation processing method will be described primarily. The interpolation processing device is provided with each means for allowing software or hardware to execute the interpolation processing method, and the program medium which stores programs for allowing the computer to execute the interpolation processing method of the present invention. Therefore, the device and the program medium will not be explained in detail.

The present invention is directed to the interpolation processing method for interpolating a point group and generating a curve or a surface defined by a control point, including a first interpolation step for performing a geometric algorithm operation which obtains a point on the curve or the surface, as a neighboring point, the point being located adjacent to the control point of an initial control polygon, and a second interpolation step for performing a geometric algorithm operation for shifting the control point from a position currently defining the curve or the surface, in a normal direction at the neighboring point, by a distance between the neighboring point and the initial control point, so as to define a position after shifting as a new position of the control point. An operation means which incorporates the geometric algorithms performs the operations.

In the two interpolation steps provided in the interpolation processing method of the present invention, the first interpolation step obtains a point on the curve or the surface as a neighboring point, which is located at the shortest distance from the initial control point, according to the operation processing of the geometric algorithm.

The neighboring point on the curve or the surface may include a point that may not be located at the shortest distance from the initial control point, and the neighboring point may be a point arbitrarily defined on a subdivision curve or a subdivision surface that is located adjacent to the initial control point. Here, the term of "neighboring" indicates being close to the initial control point, out of multiple subdivision curves and multiple subdivision surfaces, and a point on the neighboring curve or the neighboring surface is assumed as the neighboring point. It is desirable that the neighboring point is the shortest distance point, but it is not necessarily the shortest distance. It may be an arbitrary point such as the center point and the centroid of the limit surface $S^\infty$ or the subdivision surface $S^j$. It may be a midpoint, for instance, other than the shortest distance, in the case of curve.

The first interpolation step is an operation processing for obtaining a neighboring point on the curve or on the surface, in which a perpendicular line is dropped from each initial control point of the control polygon to the curve or the surface, assuming that a position of a perpendicular foot on the curve or on the surface as the neighboring point.

The second interpolation step is an operation processing for obtaining a new position of the control point, in which a distance between the perpendicular foot and the initial control point is obtained, assuming a direction of the perpendicular line as a normal direction, shifting by the distance above, the control point defining the current curve or the current surface at the present time in the normal direction from the curve or the surface, and a position after the shifting is defined as a new position of the control point.

When the control point obtained by the aforementioned interpolation steps is assumed as the control point of the control polygon and a curve or a surface is newly obtained, the newly obtained curve or surface approaches the original point group, thereby interpolating the point group, more accurately than the curve or surface before the interpolation.

The distance between the point group and the curve or the surface is obtained, the distance and a predetermined threshold are compared, and the first interpolation step and the second interpolation step are iterated until the distance satisfies the threshold or becomes smaller than the threshold. The threshold corresponds to a preset error between the point group and the curve or the surface, and when the distance between the point group and the curve or the surface satisfies the threshold or becomes smaller than the threshold, it is guaranteed that the curve or the surface exists in a tolerance defined by the threshold from the point group.

The distance between the point group and the curve or the surface may be an average squared distance or a maximum squared distance of the distance between the perpendicular foot of each initial control point and the initial control point.

In the interpolation processing, the operation of the geometric algorithm is performed, assuming the point group as the initial control polygon and this initial control polygon is assumed as the control polygon in the first interpolation step and the second interpolation step for the first time, and from the second time of the first interpolation step and the second interpolation step, the control point obtained by the interpolation steps is assumed as the control polygon when the operation of the geometric algorithm is performed.

The surface may be defined by the control point that is determined by the subdivision or the like, such as B-Spline surface, Loop subdivision (non-patent document 3), and Catmull-Clark subdivision (non-patent document 4) or Doo-Sabin subdivision (non-patent document 5) using a quadrilateral mesh.

The curve may be defined by the control point that is determined by the B-Spline curve or Chaikin subdivision (non-patent document 6). It is to be noted here that Chaikin subdivision converges into a quadratic B-spline curve. In general, the interpolation is possible as to the n-th order B-Spline curve.

An analytical evaluation of the differential geometric shape at each vertex of the polygon mesh according to the present invention uses a maximum principal curvature κ1, a minimum principal curvature κ2, and a principal direction of the subdivision surface, as evaluation values for evaluating the shape of the surface.

The maximum principal curvature κ1, a minimum principal curvature κ2 can be obtained by the following operations according to programs or in an operation circuit; operations for obtaining derivatives, ru, rv, ruu, uv, and rvv as to arbitrary parameters u and v of the surface r(u,v) on the parametric surface r(u,v) of the subdivision surface represented by parameters, operations for obtaining E=ru·ru, F=ru·rv, G=rv·rv, L=ruu·N, M=ruv·N, and G=rvv·N, by using the obtained derivatives, and operations for obtaining the maximum principal curvature $κ1=H+(H^2-K)^{1/2}$, and/or for obtaining the minimum principal curvature a minimum principal curvature $κ2=H-(H^2-K)^{1/2}$. Here, K represents Gaussian curvature and H represents a mean curvature.

The principal direction of the subdivision surface in a three-dimensional space is obtained by executing a conversion process according to programs or in the operation circuit, the conversion process is to convert the uv plane into the three-dimensional space by substituting the maximum principal curvature κ1 or the minimum principal curvature κ2 on the uv plane of the surface r(u,v) for κ in the formula, p=(ru+λrv)/(|ru+λrv|).

According to the analytical evaluation of the differential geometric shape on each vertex of the polygon mesh, an evaluation which is more precise than the conventional methods can be carried out.

EFFECT OF THE INVENTION

As described above, according to the present invention, in the process for interpolating the point group, it is possible to obtain an interpolation result with little undulation, neither requiring enormous amount of operation processing nor increasing the processing steps.

According to the present invention, it is possible to generate a subdivision surfaces for interpolating the point group, without solving a linear system.

Furthermore, according to the present invention, it is possible to analytically evaluate a differential geometric shape on each vertex of the polygon mesh, with a high degree of precision.

BRIEF DESCRIPTION OF DRAWINGS

FIG. 5 is a flowchart to explain the case where a curve is generated by a two-dimensional point group or control polygon mesh;

FIG. 9 is a flowchart to explain the case where a surface is generated by a three-dimensional point group or control polygon mesh;

FIG. 11 schematically illustrates control points and surface to explain the case where a surface is generated by three-dimensional point group or control polygon mesh;

DENOTATION OF REFERENCE NUMERALS

1 INPUT MEANS
2 MEMORY MEANS
2a DATA STORAGE
2b OPERATION TOOL PROGRAM STORAGE
2c OPERATION PROCESSING PROGRAM PART
2d PRIMARY STORAGE
2e OPERATION RESULT STORAGE
3 OPERATION MEANS
4 DISPLAY MEANS
5 OUTPUT MEANS

BEST MODE FOR CARRYING OUT THE INVENTION

Hereinafter, preferred embodiments of the present invention will be explained in detail, with reference to the accompanying drawings.

Figure 1:
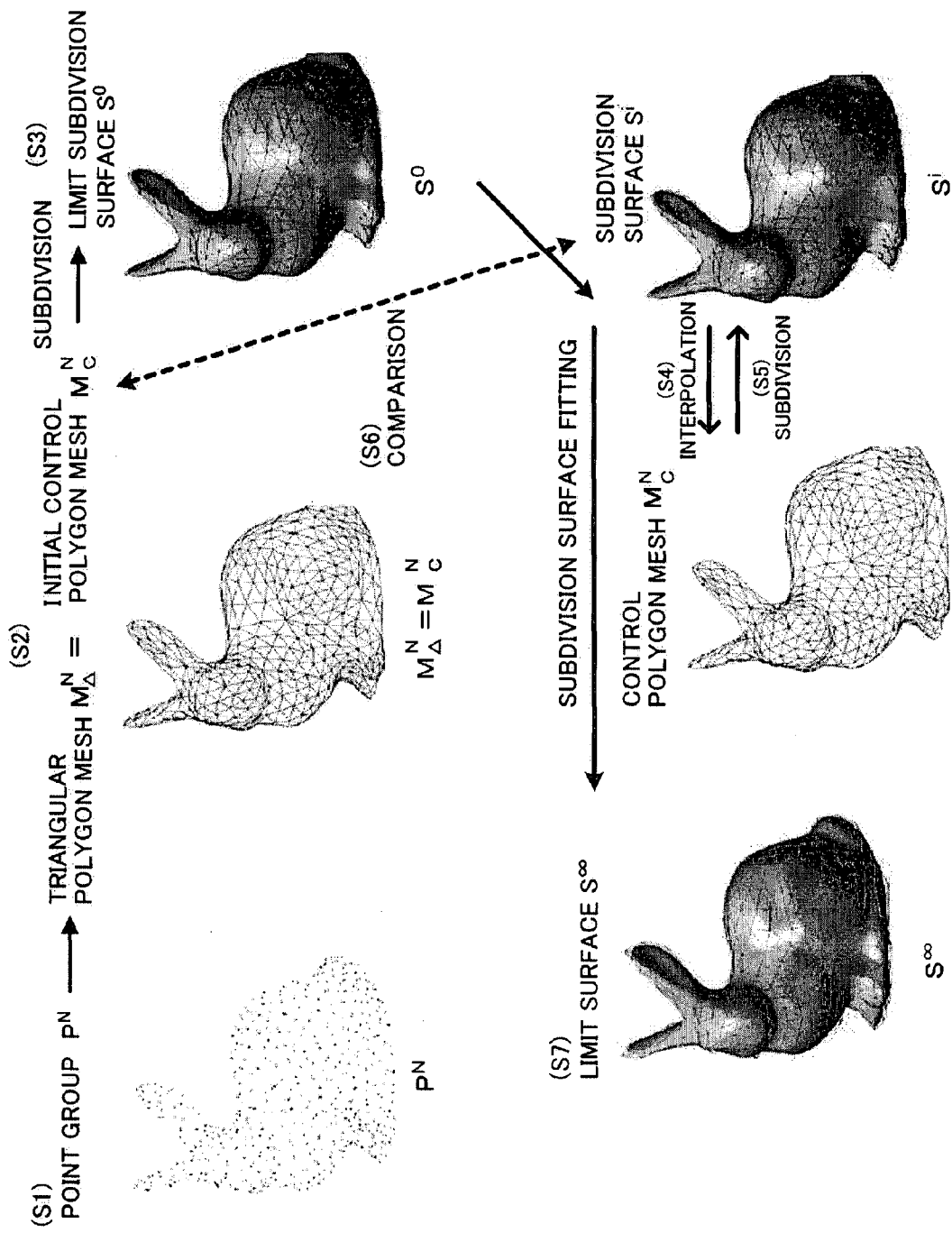
FIG. 1 schematically illustrates the interpolation processing according to the present invention.
Figure 2:
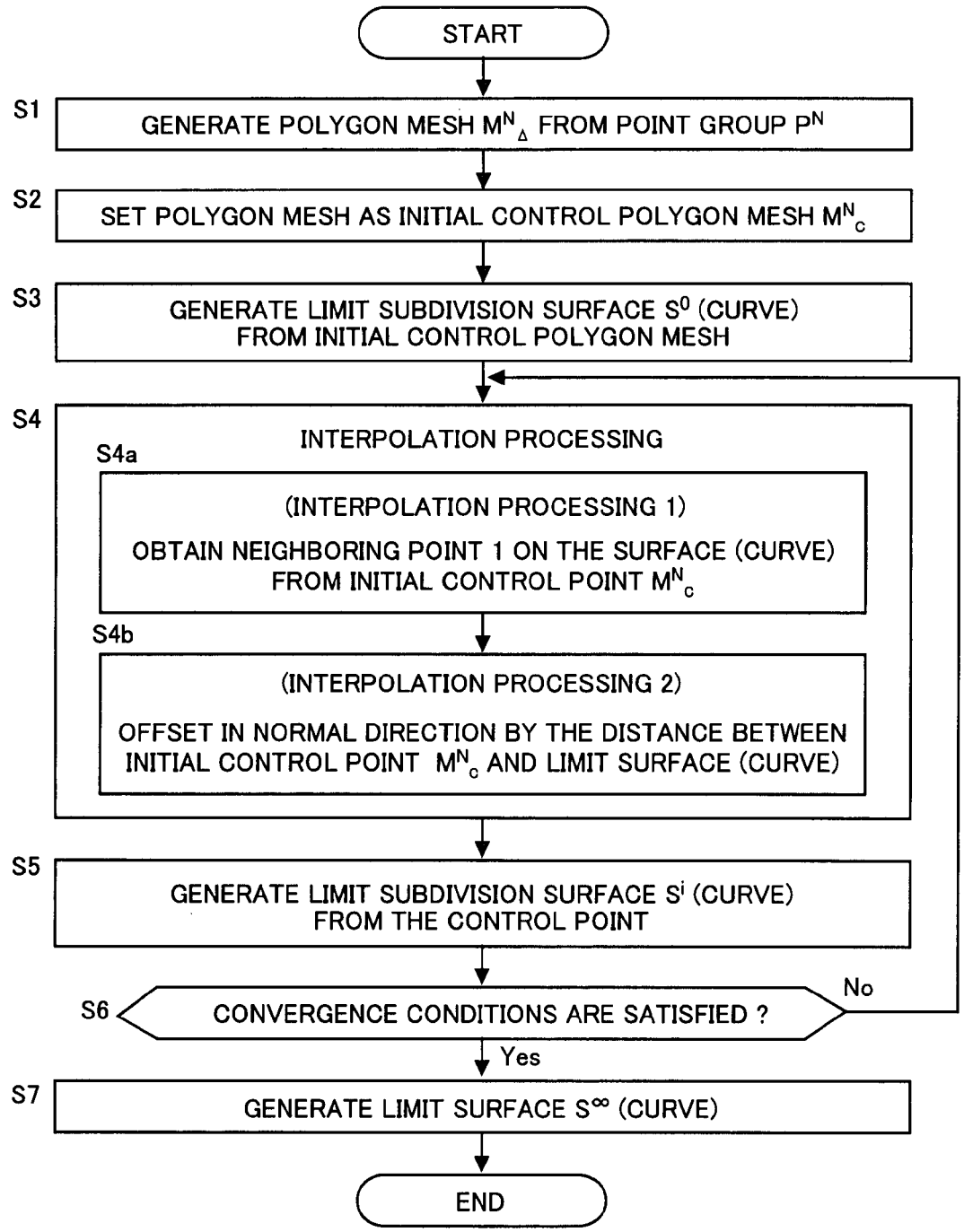
FIG. 2 is a flowchart to schematically explain the interpolation processing according to the present invention.

FIG. 1 schematically illustrates the interpolation processing, FIG. 2 is a flowchart thereof, and FIG. 3 illustrates a first interpolation step and a second interpolation step. FIG. 4 is a schematic configuration diagram of an interpolation processing device.

FIG. 1 and FIG. 2 schematically illustrate a procedure to obtain a limit surface $S^\infty$ from a point group $P^N$. It is to be noted that those figures illustrate the procedure starting from high density and irregular point group data (point group $P^N$), obtained from a 3D laser scanner (a three-dimensional shape measure) or the like, until obtaining the final limit surface $S^\infty$ which interpolates the point group $P^N$. Alternatively, this procedure may start from a polygon mesh obtained from the point group $P^N$ to acquire the limit surface $S^\infty$. This is because the interpolation processing according to the present invention is designed to adjust control points of a polygon, based on a normal line calculated from a differential geometric operation unit, and obtain the limit surface $S^\infty$ from the control polygon having been adjusted. Therefore, starting from the polygon mesh is possible, which is obtained from the point group $P^N$.

Here, a control polygon made up of polygon data $M^N_A$ being input, is assumed as an initial control polygon $M^N_C$, and a polygon made up of the control points, which have been offset, is referred to as just a control polygon. In addition, the control point of the initial control polygon is also referred to as an interpolation point.

It is to be noted that an explanation will be made regarding a surface primarily, but a curve can be treated in the same manner.

Firstly, the point group $P^N$ is used to generate a mesh, the point group being provided from the 3D laser scanner or the like, and a polygon mesh is obtained. A triangular mesh or a quadrilateral mesh may be employed as the polygon mesh. An existing method may be applicable for the processing to generate the mesh. Here, an explanation will be made by taking the triangular polygon mesh $M^N_A$ as an example (S1).

Assuming the triangular polygon mesh $M^N_A$ as an initial control polygon mesh $M^N_C$, a control point is defined (S2). A subdivision process utilizing this initial control polygon mesh $M^N_C$ generates a limit subdivision surface $S^0$ based on the initial mesh (S3). The limit subdivision surface $S^0$ based on the initial mesh generated in S3 is subjected to the interpolation processing to offset and adjust the position of the control point (S4). Then, according to the position of the control point being adjusted, a limit subdivision surface $S^i$ based on i-th control mesh is generated (S5).

The generated limit subdivision surface $S^i$ is compared with the initial control polygon mesh $M^N_C$, and the interpolation step of S4 is iterated until an error in distance between corresponding points converges. For the convergence of the distance error, the interpolation step of S4 is iterated until the distance error satisfies a threshold that is defined in advance (S6).

The final limit subdivision surface $S^F$, which is obtained when the distance error has converged by the interpolation processing, becomes a subdivision surface which interpolates the initial control polygon mesh $M^N_C$ (S7).

The interpolation processing of S4 incorporates two interpolation steps, S4a and S4b. The first interpolation step S4a obtains a neighboring point based on the control point, either on the limit surface $S^\infty$ or the refined subdivision surface $S^J$. The neighboring point is placed on the limit surface $S^\infty$ or on the refined subdivision surface $S^J$, which is located in proximity to a certain initial control point. For example, the neighboring point may be defined as a point in the shortest distance from the initial control point, on the limit surface $S^\infty$ or on the refined subdivision surface $S^J$.

It is desirable that the neighboring point is the point located at the shortest distance, but it is not necessarily the shortest distance. For example, the neighboring point may be any point such as a central point or a centroid on the limit surface $S^\infty$ or the refined subdivision surface $S^J$. In the case of a curve, a midpoint may be possible in addition to the shortest distance point.

If the polygon mesh is set to be sufficiently small, in many cases, a deviation from the point in the shortest distance point to the central point or the centroid may be only a little, and it can be assumed that an error, which may occur due to the deviation of the neighboring point from the shortest distance point, is only a small amount.

Figure 3A:
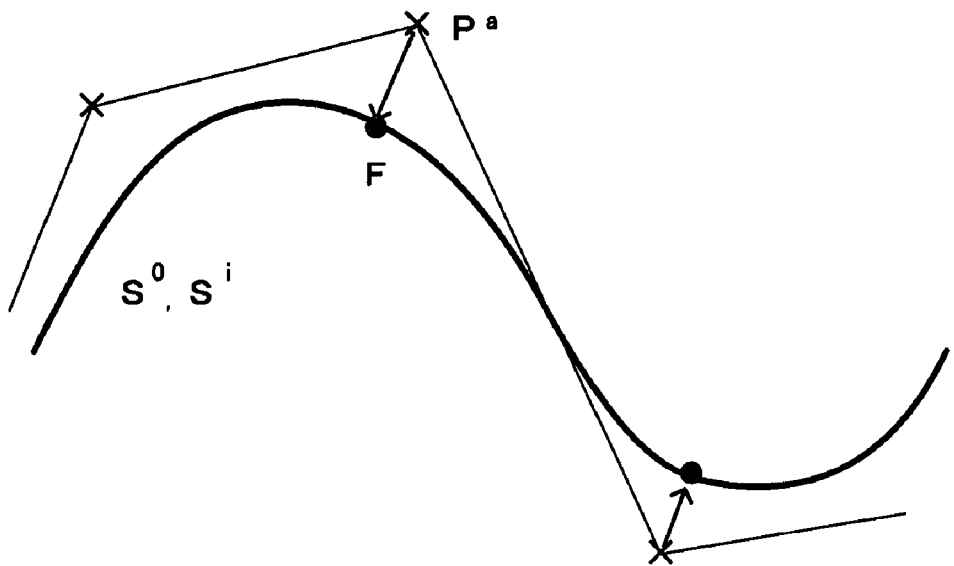
FIG. 3 illustrates a first interpolation step and a second interpolation step according to the present invention.
Figure 3B:
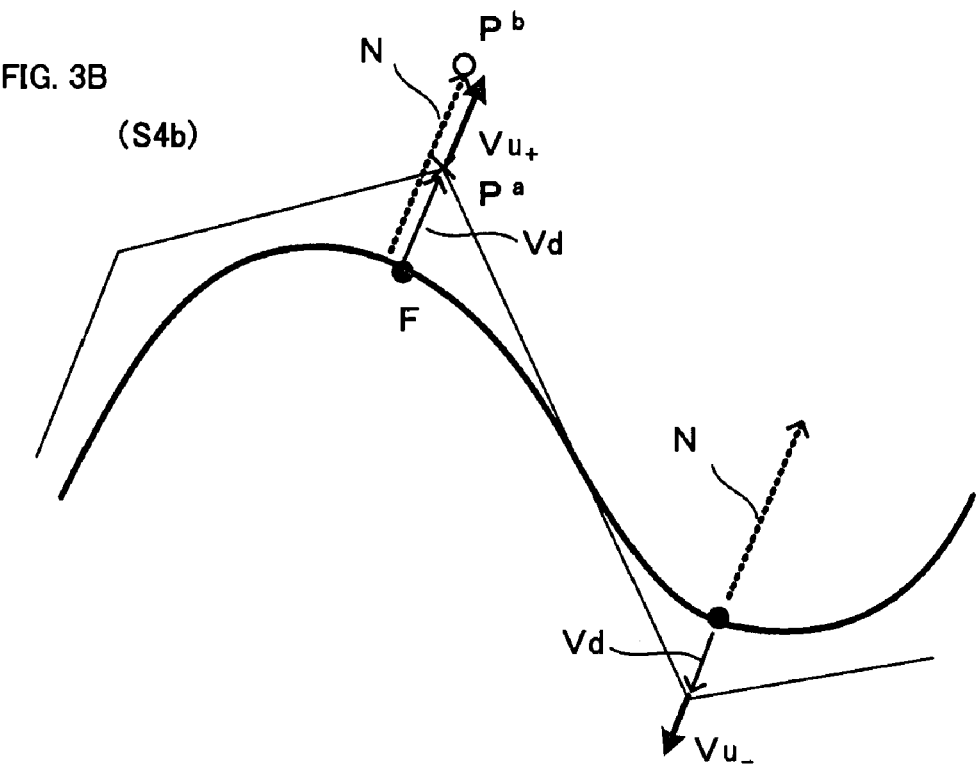
Figure 4:
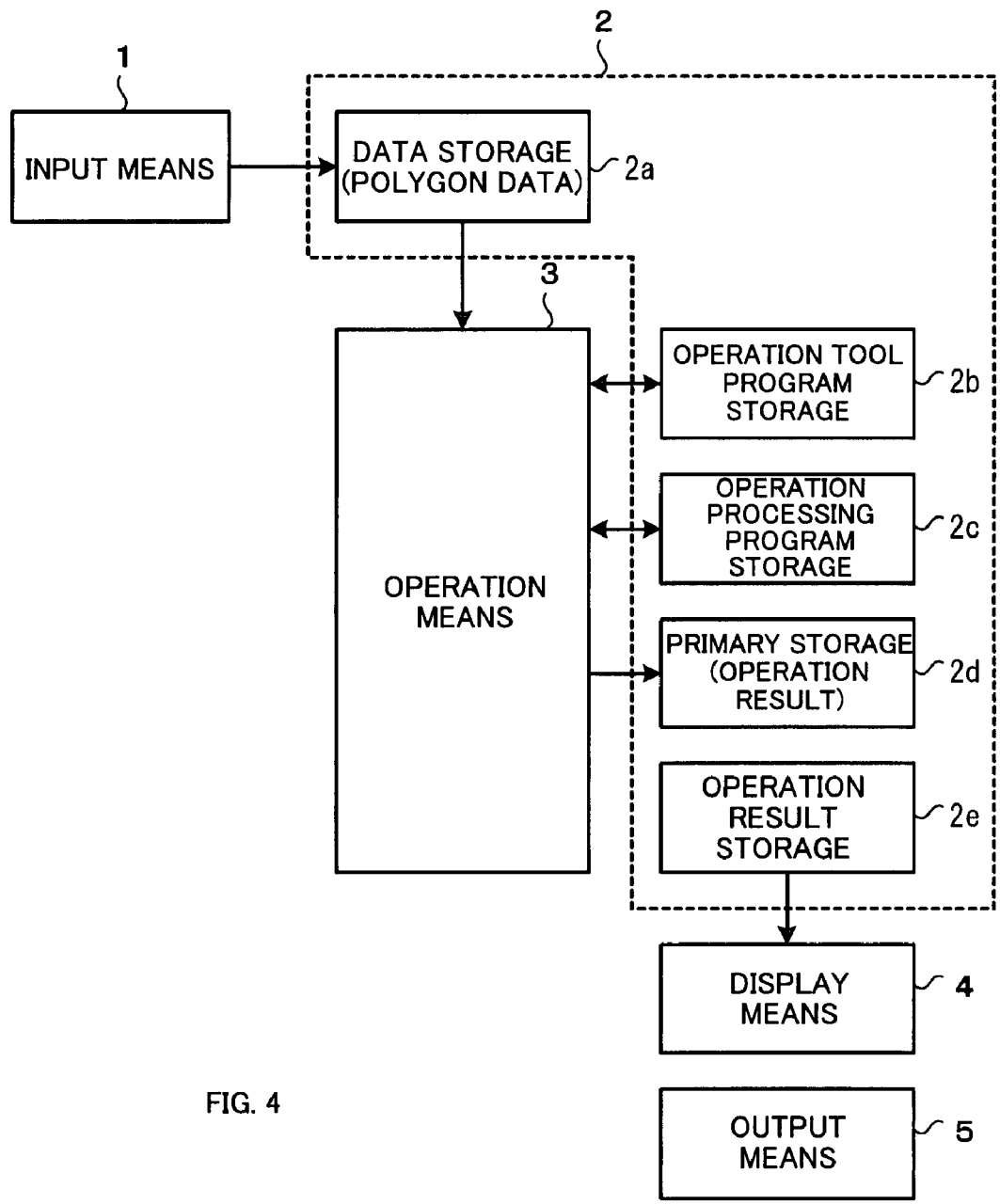
FIG. 4 is a schematic configuration diagram of an interpolation processing device according to the present invention.

FIG. 3A is an illustration to explain the first interpolation step S4a and FIG. 3B is an illustration to explain the second interpolation step S4b. It is to be noted here that the illustrations in FIG. 3 are shown two-dimensionally. Further in FIG. 3, $P_a$ represents a control point before shifting, $P_b$ represents a control point after shifting, and F represents a neighboring point obtained on the curve C.

In the step of the first interpolation processing S4a as shown in FIG. 3A, it is assumed that the initial control point $P_a$ is given at first. It is to be noted here that in the interpolation processing for the first time, the control point $P_a$ is a control point of the initial polygon mesh $M^N_C$ that is obtained from the point group $P^N$. In the interpolation processing for the second time, the control point $P_a$ is a control point of the control polygon which has shifted in position by the interpolation processing of the previous time.

Subdivision using this control point $P_a$ generates a limit subdivision surface $S^0$. Here, the limit subdivision surface based on the initial mesh is $S^0$, and the limit subdivision surfaced generated from the mesh based on i-th step is $S^i$.

On the limit subdivision surfaces ($S^0, S^1, \ldots, S^i, \ldots$), a neighboring point F associated with the initial control point $P_a$ is obtained. A perpendicular line is dropped from the initial control point $P_a$ toward the limit subdivision surface ($S^0, S^1, \ldots, S^i, \ldots$), and a point on the perpendicular foot can be assumed as the neighboring point F.

Next, in the step of the second interpolation processing S4b as shown in FIG. 3B, the initial control point $P_a$ shifts and a control point $P_b$ is obtained at a new position. The new position of the control point $P_b$ is obtained by offsetting from the position of the initial control point $P_a$ in a predetermined direction, only by a distance corresponding to the distance between the initial control point $P_a$ and the neighboring point F. The predetermined direction may be a normal direction at the neighboring point F, for instance. In FIG. 3B, Vd represents a distance vector from the limit surface to the initial control point $P_a$, Vu represents an update for offsetting the position from the initial control point $P_a$ to the control point $P_b$, and N represents the normal line at the neighboring point F on the limit surface.

In the figure, vector $V_{u+}$ offsets the position of the control point in the positive direction of the normal line N, when $N \cdot Vd > 0$. Vector $V_{u-}$ offsets the position of the control point in the negative direction of the normal line N, when $N \cdot Vd < 0$. An update vector including the direction component is expressed by:

$$V_{u\pm} = (Vd \cdot N)N$$

In the interpolation step S4, the first interpolation step S4a and the second interpolation step S4b are performed iteratively. By using the control point P obtained in the second interpolation step S4b, the control polygon mesh $M^N_C$ is subdivided in the aforementioned step of S5, and the limit subdivision surface $S^i$ is generated.

By way of example, Loop subdivision using a triangular mesh, Catmull-Clark subdivision, Doo-Sabin subdivision, or the like, using a quadrilateral mesh, may be employed as the process for subdividing the surface. These subdivisions may be applied also to a B-Spline surface.

For the subdivision of the curve, Chaikin subdivision may be used, for instance, and in addition, it can be applied to the n-th order B-Spline curve. It is to be noted that Chaikin subdivision converges into a quadratic B-Spline curve.

According to the interpolation of the present invention, there are following advantages in terms of computational cost, a surface quality, and generality of operation.

The interpolation algorithm of the present invention includes a geometric operation for calculating a distance between the initial polygon and the surface obtained by the interpolation, and a geometric operation for offsetting the position of the control point. Since it is the geometric operation, its computational cost corresponds to O(MN) according to the number of vertices N to be interpolated and the number of offset iterations M. On the other hand, a computational cost according to a conventional linear system increases drastically relative to the number of vertices N to be interpolated. Since M<<N in general, it is possible to lower the increase rate of the computational cost, more considerably than the conventional method, according to the interpolation of the present invention. In addition, from the viewpoint of computational speed, it is possible to generate an interpolated surface at extremely high speed.

The interpolation algorithm according to the present invention will have less chance to generate undulations on the interpolated surface being generated, unlike other interpolation methods.

In addition, the interpolation algorithm of the present invention generates a surface by using a simple geometric process. Therefore, it can be applied to not only a subdivision surface but also a curve and a surface defined by control points, such as a B-Spline surface and curve, thereby showing generality in the surface generation.

FIG. 4 shows one configuration example for allowing a computer to execute a program that stores software of the interpolation processing according to the present invention.

The input means 1 inputs data of the point group $P^N$, or the control polygon mesh $M^N_A$ generated from the point group $P^N$, and stores the input information in the data storage 2a in the memory means 2. The memory means 2 incorporates, in addition to the data storage 2a, an operation tool program storage 2b for storing an operation tool program for conducting a differential geometric operation, an operation processing program storage 2c for storing a geometric operation processing program for conducting a differential geometric operation for the interpolation processing, and in addition, an operation processing program for conducting a subdivision processing, and the like, a primary storage 2d for temporarily stores an operation result and the like, and an operation result storage 2e for storing an operation result of the surface obtained by the interpolation processing and the like.

The operation means 3 uses data of the point group $P^N$ or the control polygon mesh $M^N_A$, follows the operation procedure according to the programs stored in the operation processing program storage 2c, and further, sequentially reads from the operation tool program storage 2b, the operation tool programs designated in the stored programs, so as to conduct the operation processing.

A result of the operation stored in the operation result storage 2e is read out to be displayed on the display means 4 or output to the output means 5. The output means 5 may be a recording device for recording the operation result on a recording medium, for instance, an external device such as processing equipment, which performs a predetermined action by using the operation result.

It is to be noted that the configuration for performing the aforementioned software processing can be applied to a dedicated software processing unit, or a commonly used personal computer.

In the structure above, functions implemented by the operation means including the memory means are configured in a form of circuit, thereby enabling hardware to implement the functions.

Next, details of the interpolation processing according to the present invention will be explained for the case where a curve is generated by using a two-dimensional point group or control polygon mesh, and for the case where a surface is generated by using a three-dimensional point group or control polygon mesh.

Hereinafter, firstly, the case where a curve is generated by using a two-dimensional point group or control polygon mesh will be explained with reference to the flowchart of FIG. 5, schematic diagrams illustrating the control points and curves as shown in FIG. 6 and FIG. 7, and the illustrations interpolating the curve in FIG. 8. Secondly, the case where a surface is generated by using a three-dimensional point group or control polygon mesh will be explained with reference to the flowchart of FIG. 9, and schematic diagrams illustrating the control points and curves as shown in FIG. 10 to FIG. 16.

Initially, the case where a curve is generated by using a two-dimensional point group or control polygon mesh will be explained. It is to be noted here that the following flow is just an example, and another configuration of flow may be applicable, if it includes a step and a procedure to implement the first interpolation processing and the second interpolation processing according to the present invention.

Figure 6A:
FIG. 6 schematically illustrates control points and curves to explain the case where a curve is generated by the two-dimensional point group or control polygon mesh.
Figure 6B:
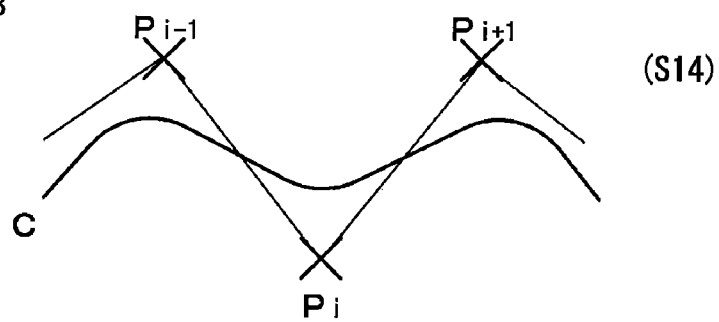

A two-dimensional control polygon is acquired from the point group $P^N$. It is further possible to read out the two-dimensional control polygon that has been obtained in advance and stored in the memory means (S11). FIG. 6A shows a state of step S11. The storage 2a stores the acquired control polygon as an initial control polygon $P_i$ (S12), and this initial control polygon $P_i$ is stored as a control point $P^{k-1}_i$ (S13). The subdivision process is performed by using the control point $P^{k-1}_i$ being stored, and the curve C is generated. Here, the superscript k−1 indicates the number of offset iterations. For the subdivision process, B-Spline curve interpolation is employed, for instance. This subdivision process reads out an operation processing program from the operation processing program storage 2c, and when an operation tool is described in the operation processing program, the operation tool stored in the operation tool program storage 2b is employed to execute a differential geometric operation with the use of the control point $P_i$. FIG. 6B illustrates the state of step S14.

Hereinafter, the first interpolation processing shown in S15 and S16, and the second interpolation processing shown from S17 to S19 are iterated, and the curve C is generated, which interpolates the point group.

Figure 6C:
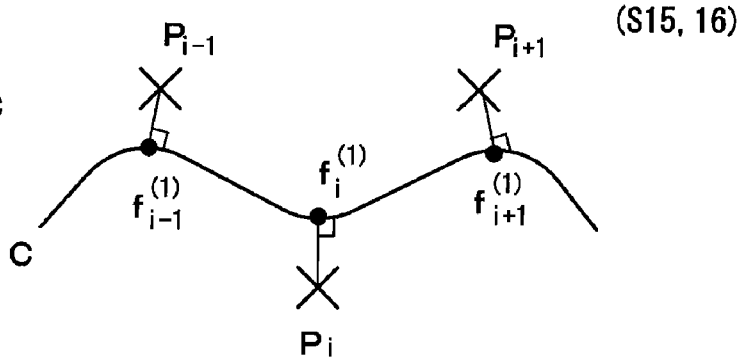
Figure 7A:
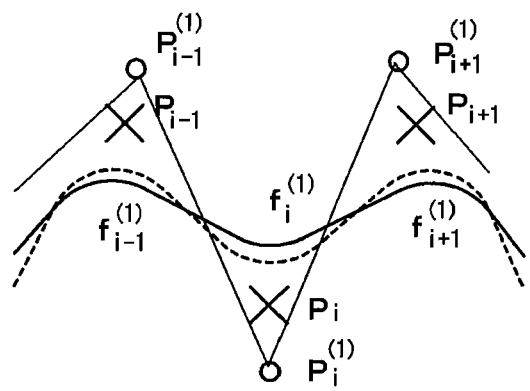
FIG. 7 schematically illustrates control points and curves to explain the case where a curve is generated by the two-dimensional point group or control polygon mesh.
Figure 7B:
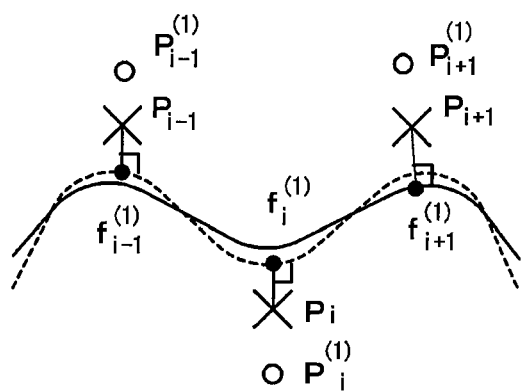

In the first interpolation processing, a perpendicular line is dropped from the initial control point $P_i$ of the initial control polygon to the curve C (the curve C generated in step S14, or the curve C generated in step S20), and a perpendicular foot $f^k_i$ is obtained (S15). Then, a distance between the initial control point $P_i$ and the perpendicular foot $f^k_i$, $\|P_i-f^k_i\|$, is obtained. The perpendicular foot $f^k_i$ having been obtained is a neighboring point of the initial point $P_i$, on the curve C. The computation for obtaining the perpendicular line and the distance can be performed by a geometric operation (S16). FIG. 6C illustrates the states of steps S15 and S16, when the initial control polygon $P_i$ is assumed as the control polygon in the first interpolation processing. FIG. 7B illustrates the states of S15 and S16 in the interpolation processing from the second time.

It is to be noted that the perpendicular line is dropped from the initial control point to the curve or the surface, and only when the perpendicular line is dropped for the first time, the control point defining the curve or the surface is identical to the initial control point from which the perpendicular line is dropped.

Figure 6D:
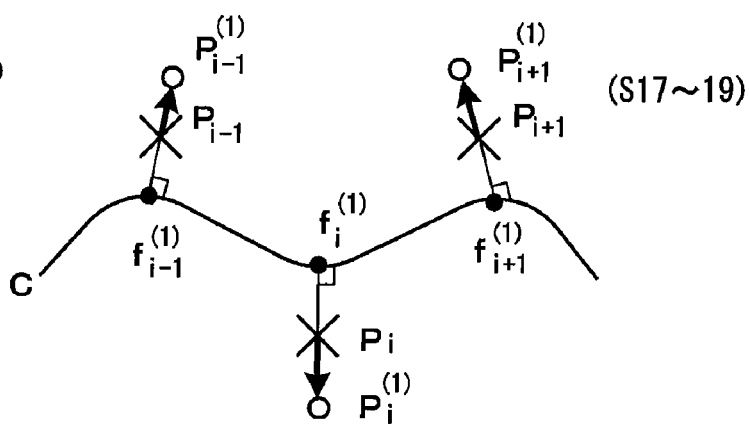
Figure 7C:
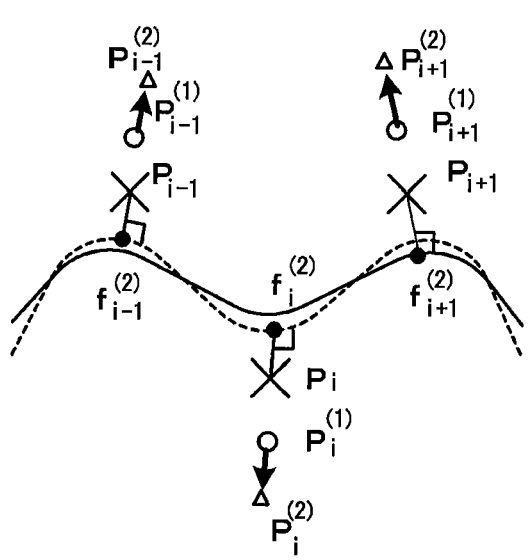

Next, in the second interpolation processing, a normal line at the perpendicular foot $f^k_i$ on the curve C is obtained (S17). In the direction of the normal line having been obtained, the position of the control point $P^{k-1}_i$ which defines the current curve is offset, only by the distance $\|P_i-f^k_i\|$ between the initial control point $P_i$ and the perpendicular foot $f^k_i$ (S18), and the position after the offset is assumed as a new position of the control point $P^{k-1}_i$. The operation for obtaining the normal line and the operation for offsetting the position of the control point can be performed by differential geometric operations (S19). FIG. 6D illustrates the states of steps from S17 to S19 when the initial control polygon $P_i$ is assumed as the control polygon in the interpolation processing for the first time, and FIG. 7C illustrates the states of steps from S17 to S19 in the interpolation processing from the second time.

The subdivision process is performed based on the new position of the control point $P^{k-1}_i$ that is obtained in step S19, and the curve C is generated (S20). FIG. 7A illustrates the state of step S20 where the initial control polygon $P_i$ is assumed as the control polygon in the interpolation processing for the first time.

Figure 7D:
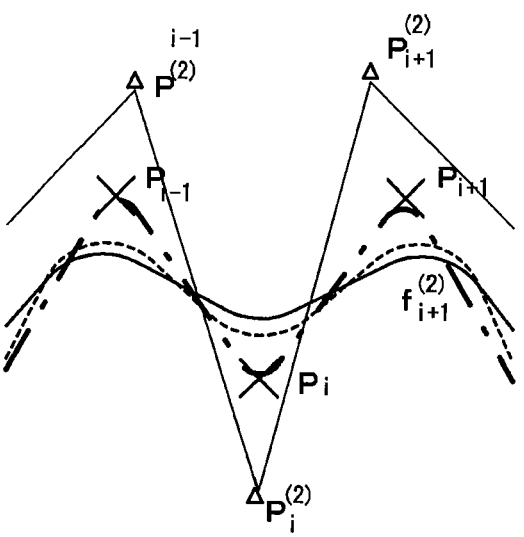

The distance between the curve C generated in S20 and the initial control polygon $P_i$ is obtained, and the distance being obtained is compared with a threshold that is defined in advance. Then, the steps from S15 to S21 are iterated until the distance satisfies the threshold or becomes equal to or less than the threshold. FIG. 7D illustrates the state of step S20 in the interpolation processing from the second time.

The distance between the curve C and the initial control polygon $P_i$ obtained in step S21 represents an error between the curve interpolating the point group, and the point group itself. The threshold corresponds to a tolerable error for the curve that interpolates the point group.

The distance between the point group and the curve or the surface may be an average error or a maximum error, obtained from the distance value between the initial control point and the perpendicular foot at each initial control point.

Therefore, in the comparison step of S22, if it is confirmed that the distance has become the threshold or less, the obtained curve C interpolates the point group within the range of tolerable error (S23).

The interpolation algorithm according to the present invention has a superior convergence, and the control points are offset by two or three times of interpolation processing, thereby generating a highly precise interpolation curve. It is to be noted here that a shape having a sharp corner shows a tendency that the convergence proceeds slower than a smooth part. In order to treat such a pointed part, firstly, the interpolation curve is generated by overall offsetting, and only the vertices showing slow convergence are selected next. Then, the offset is iterated locally, thereby allowing the interpolation curve to be finalized with a high degree of precision.

Figure 8A:
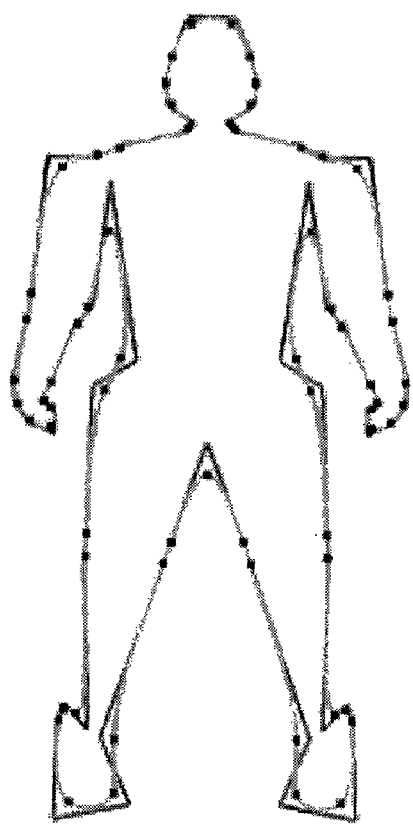
FIG. 8 illustrates examples of curves which interpolate the two-dimensional point group.
Figure 8B:

FIG. 8 illustrates one example of interpolation of two-dimensional (planar) curve, showing curves that are generated for interpolating the point group representing human silhouette. FIG. 8A is an overall view, and FIG. 8B is a partially enlarged view. In FIG. 8, the points indicate the point group, and the curve interpolates the point group. The straight lines link the control points to generate the curve.

Next, there will be explained the case where a surface is generated by using a three-dimensional point group or control polygon mesh. It is to be noted here the following flow is just an example, and another configuration of flow may be applicable, if it includes a step and a procedure to implement the first interpolation processing and the second interpolation processing according to the present invention.

In the flow of the interpolation algorithm, a triangular polygon mesh having a given arbitrary shape is used as the initial control polygon, and a limit surface is obtained, which is generated therefrom. Next, a perpendicular line is dropped from the initial control point to the limit surface generated from the control polygon (the initial control point for the first time, and the offset control point from the second time), and then the shortest distance is measured. In addition, a normal line at the perpendicular foot on the limit surface is obtained, and the offset is performed only by the shortest distance between the initial control point and the limit surface. By iterating the steps above, a position of the control point is obtained for allowing the limit surface to interpolate the initial control polygon.

In the flowchart shown in FIG. 9, a three-dimensional control polygon $M^N_A$ is obtained from the point group PN. Alternatively, it is possible to read out the three-dimensional control polygon $M^N_A$, which was obtained and stored in advance in the memory means. For example, a triangular polygon mesh or a quadrilateral polygon mesh may be used as the three-dimensional control polygon. Loop subdivision (non-patent document 3) is known as a subdivision method using the triangular polygon mesh, and Catmull-Clark subdivision (non-patent document 4), Doo-Sabin subdivision (non-patent document 5), and the like, are known as the subdivision method using the quadrilateral polygon mesh (S31).

Figure 10A:
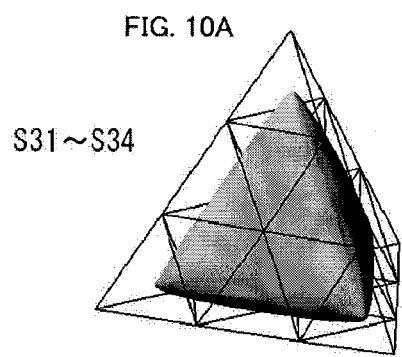
FIG. 10 schematically illustrates control points and surface to explain the case where a surface is generated by three-dimensional point group or control polygon mesh.

FIG. 10A illustrates the state of step S31. The control polygon $M^N_A$ having been obtained is stored in the storage 2a as the initial control polygon $M^N_C$ (S32), and the initial control polygon mesh is stored as the control point $P^{k-1}_i$ (S33).

Figure 10B:
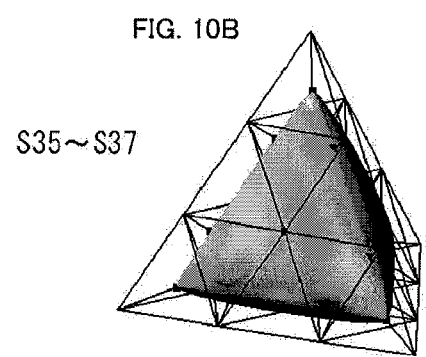

The stored control point $P^{k-1}_i$ is used to perform the subdivision process, so as to generate a limit surface $S^0$. When the perpendicular line is dropped for the first time, $P^{k-1}_i = P_i$. The Loop subdivision interpolation can be employed as the subdivision process, in the case where the triangular polygon mesh is used, for instance (S34). FIG. 10A illustrates the state in step of S34. In the subdivision process, if the operation processing program is read out from the operation processing program storage 2c and the operation tool is described in the operation processing program, the operation tool stored in the operation tool program storage 2b is used to execute a differential geometric operation by using the initial control point $P_i$. FIG. 10B illustrates the state in step of S35.

Hereinafter, the first interpolation processing of S35 and S36, and the second interpolation processing of S37 to S39 are iterated, so as to generate a surface $S^i$ that interpolates the point group.

In the first interpolation processing, a perpendicular line is dropped from the initial control point $P_i$ to the surface S (the surface $S^0$ if generated through step S34, or the surface $S^i$ defined by the control point $P^{k-1}_i$ generated in step S40), and the perpendicular foot $f^k_i$ is obtained. It is to be noted here that only when the perpendicular line is dropped for the first time, $P_i = P^{k-1}_i$ (S35). Then, a distance between the initial control point $P_i$ and the perpendicular foot $f^k_i$, $\|P_i - f^k_i\|$, is obtained. The perpendicular foot $f^k_i$ being obtained is a neighboring point of the initial point $P_i$, on the limit subdivision surface $S^i$. The computation for obtaining the perpendicular line and the distance can be performed by a geometric operation (S36). FIG. 10B illustrates the states of steps S35 and S36 of the operation for obtaining the perpendicular line and the distance in the interpolation processing.

Similar to the first interpolation processing in the two-dimension, the perpendicular line is dropped from the initial control point to the curve or to the surface. Only when the perpendicular line is dropped for the first time, the control point defining the surface is identical to the initial control point from which the perpendicular line is dropped.

Next, in the second interpolation processing, a normal line at the perpendicular foot $f^k_i$ on the surface $S^i$ is obtained (S37). In the direction of the normal line being obtained, the position of the control point $P^{k-1}_i$ which defines the current limit surface is offset, only by the distance between the initial control point $P_i$ and the perpendicular foot $f^k_i$, $\|P_i - f^k_i\|$, which was obtained in S36 (S38), and the position after the offset is assumed as a new position of the control point $P^{k-1}_i$.

Figure 10C:
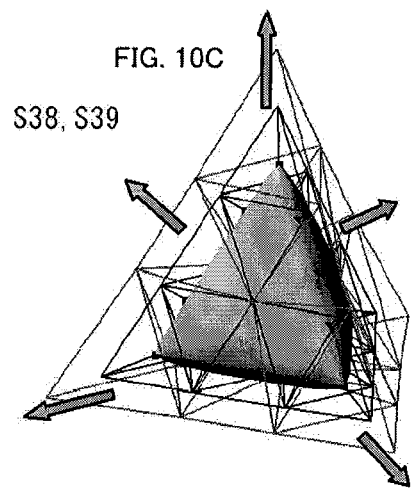

The operation for obtaining the normal line, and the operation for offsetting the position of the control point can be performed by a differential geometric operation (S39). FIG. 10C illustrates the states of the steps from S37 to S39 in which the position of the control point $P^{k-1}_i$ is offset in the interpolation processing, and the offset position is assumed as a new position of the control point $P^{k-1}_i$.

Figure 10D:
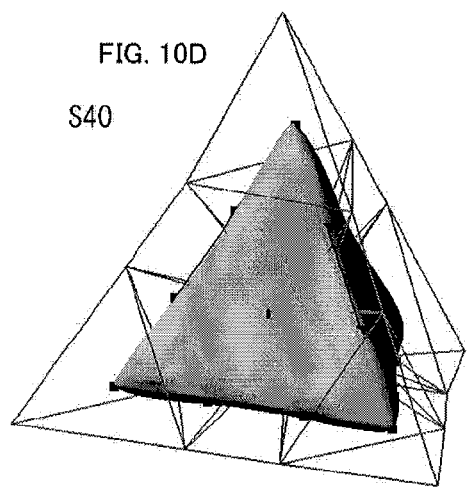

The subdivision process is performed based on the new position of the control point $P^{k-1}_i$ that is obtained in step S39, and the surface $S^i$ is generated (S40). FIG. 10D illustrates the state of step S40 where the initial control polygon $P_i$ is assumed as the control polygon.

The distance between the surface $S^i$ obtained in step S40 and the initial control polygon $P_i$ is obtained, and the distance being obtained is compared with a threshold that is defined in advance. Then, steps from S35 to S41 are iterated until the distance satisfies the threshold, or becomes equal to or less than the threshold.

The distance between the surface $S^i$ obtained in step S41 and the initial control polygon $P_i$ represents an error between the surface interpolating the point group and the point group itself. The threshold corresponds to a tolerable error for the surface that interpolates the point group.

The distance between the point group and the curve or the surface may be an average error or a maximum error, obtained from the distance value between a point corresponding to the control point and the perpendicular foot at each initial control point.

Therefore, in the comparison step of S42, when it is confirmed that the distance has become equal to or less than the threshold, the obtained surface S$^i$ interpolates the point group (initial control polygon) within the range of tolerable error (S43).

The first interpolation processing described above will be explained more in detail, with reference to FIG. 11 to FIG. 16.

As described above, in the first interpolation processing, a perpendicular line is dropped from the initial control point P$_i$ to the limit surface S, thereby obtaining the shortest distance between the initial control point P$_i$ and the limit surface S. The computation of the shortest distance corresponds to an orthogonal projection from the control point to the limit surface. In performing this computation, Stam's theory (non-patent document 7) can be applied. According to the theory of Stam, the number of extraordinary point belonging to a triangular patch serving as a parameter area must be one at most. It is to be noted here that a regular surface that does not include any extraordinary point is defined by twelve control points.

FIG. 11 illustrates the subdivision process for the triangular patches provided with the extraordinary point. FIG. 11A illustrates the triangular patches including two extraordinary points (A and B in the figure).

Here, in order to make the number of extraordinary point to be one at most, which belongs to the triangular patch, the polygon surrounding the targeted control point is subjected to the Loop subdivision method locally for one time. FIG. 11B illustrates the triangular patch that has been subjected to the subdivision once as to the targeted control points. FIG. 11C to FIG. 11F illustrate four subdivided patches generated by the subdivision. Among these four subdivided patches, each of the subdivided patches shown in FIG. 11C and FIG. 11D has one extraordinary point, and the subdivided patches shown in FIG. 11E and FIG. 11F do not include any extraordinary point.

Accordingly, one-time Loop subdivision method is applied locally to the polygon around the targeted control point, thereby allowing the number of the extraordinary point to be one at most, which belongs to the triangular patch serving as the parameter area.

If the valence of the targeted control point is assumed as N, the number of the Loop subdivision patches around the control point is also N. Therefore, initially, it is necessary to choose from N patches, a triangular patch (hereinafter, referred to as "parameter area") for generating a limit surface to which the perpendicular line is dropped. However, it is difficult to choose such a parameter area in advance.

In the example here, a Half-Edge structure is utilized to find a surface which is referred to initially from the control point, and it is assumed as the parameter area being the closest to the control point among the Loop subdivision patches. It is to be noted here that the Half-Edge structure is one of data structures for efficiently treating a polygon mesh element that is made up of Vertex, Edge, and Face. In general, it is a data structure used for solid model, which incorporates five data; Face, Edge, Half-Edge, Vertex, and Loop. As for the Half-Edge structure, in addition to the structure including the five data elements, some data structures do not include the elements of Loop and/or Edge. In this data structure, a pair of Half-Edge having different directions are defined for one Edge, and according to the Half-Edges, it is possible to efficiently treat data of vertices on both ends of the Edge and data of the surfaces placing the Edge therebetween.

Figure 12A:
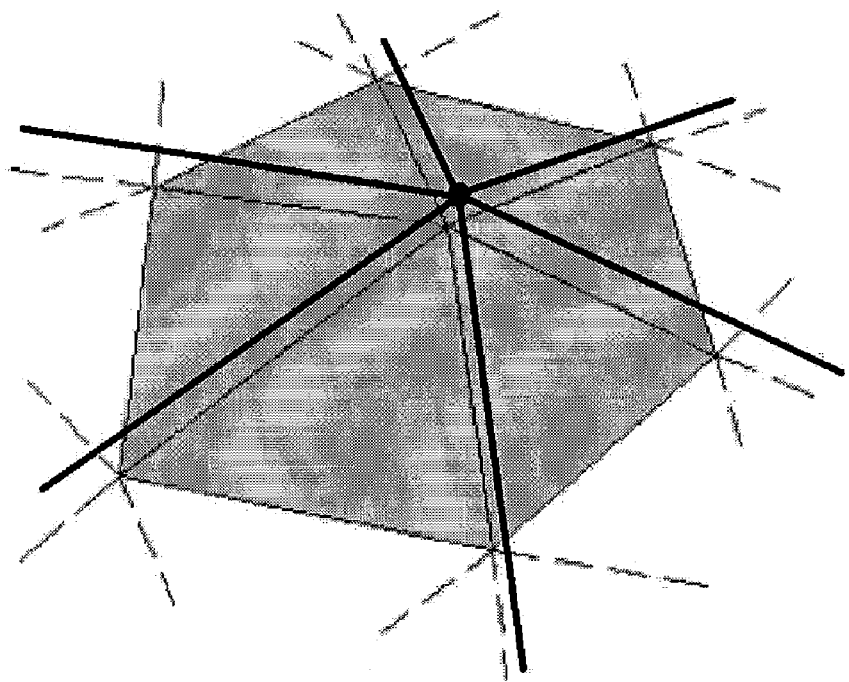
FIG. 12 schematically illustrates control points and surface to explain the case where a surface is generated by three-dimensional point group or control polygon mesh.
Figure 12B:
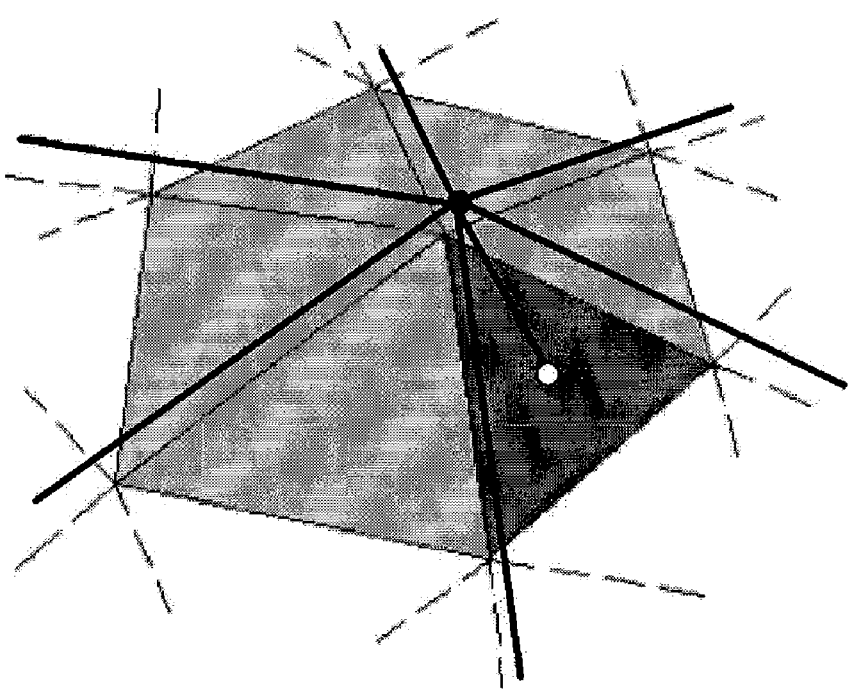

In FIG. 12, the black circle represents the initial control point (interpolation point), the thick solid line passing through the control point represents a polygon before subdivision around the control point, and the fine solid line and the broken line represent polygons having been subjected to one-time subdivision. In addition, the light background pattern portions represent subdivision patches (parameter area) that may be used for generating the limit surface patch to which the perpendicular line is dropped, and the dark background pattern portion represents a subdivision patch on the surface which is initially referred to from the control point by using the Half-Edge structure. In FIG. 12B, the outline point on the subdivision patch represented by the dark ground pattern indicates a parameter position serving as an initial value.

In other words, in the subdivision patches, which is obtained by applying one-time Loop subdivision to the initial control polygon, the perpendicular line is dropped to the limit surface patch, which is generated by the control polygon made up of the local subdivision patch that is close to the targeted vertex.

Figure 13:
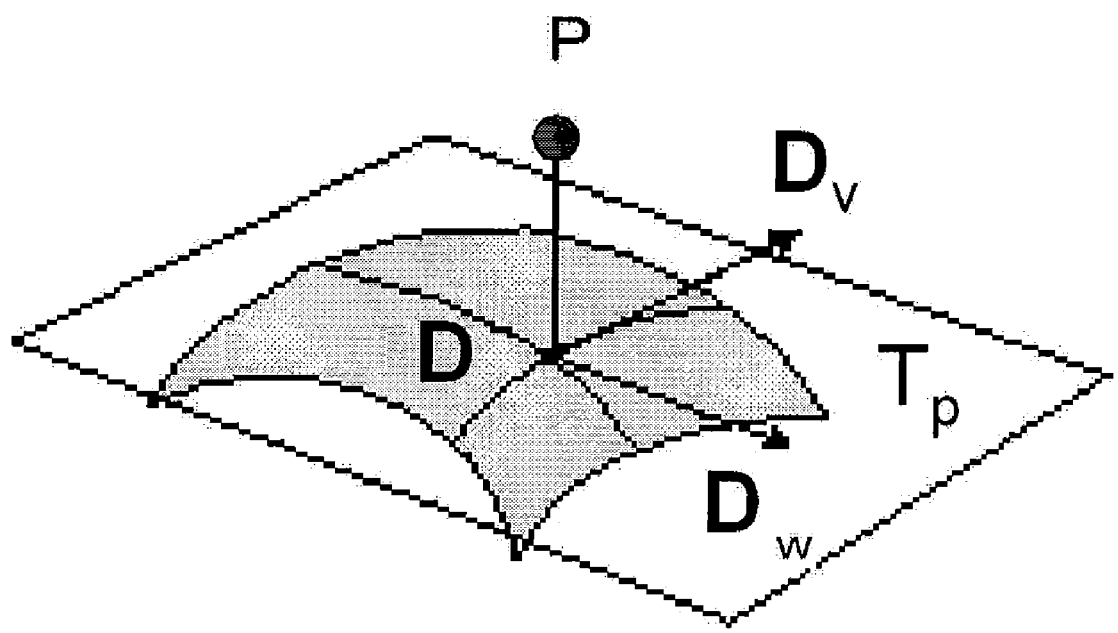
FIG. 13 schematically illustrates control points and surface to explain the case where a surface is generated by three-dimensional point group or control polygon mesh.

Next, a point in the parameter area will be obtained, the point serving as the foot of the perpendicular line. FIG. 13 is an illustration to explain the perpendicular line against the parameter area. In FIG. 13, Tp represents a tangent plane, P represents a vertex of the initial control polygon, D(v,w) represent points on the limit surface with the parameter (v,w), ($\Delta$v, $\Delta$w) represent an update parameter of the surface, i represents a control point number, and j represents the number of iterations of the Newton method.

The perpendicular line from one control point to the limit surface is given by the following formulas:

$$[(P-D(v,w)) \cdot Dv(v,w)]=0$$

$$[(P-D(v,w)) \cdot Dw(v,w)]=0 \quad (1)$$

It is to be noted that v and w represent parameters of the surface, Dv and Dw represent differentiations of the subdivision surface D, in the direction v and in the direction w, respectively.

According to Marinov and Kobbelt (non-patent document 7), a point being the shortest distance from each control point P to the subdivision surface D established by the control points, can be obtained by the perpendicular line from P to the tangent plane, which is obtained by solving the following linear system relating to the parameters ($\Delta$v, $\Delta$w) of the surface:

$$[P-(D(v,w)+Dv(v,w)\Delta v+Dw(v,w)\Delta w)] \cdot Dv(v,w)]_i^j=0$$

$$[P-(D(v,w)+Dv(v,w)\Delta v+Dw(v,w)\Delta w)] \cdot Dw(v,w)]_i^j=0 \quad (2)$$

Here, i represents the control point number, and j represents the number of iterations of the Newton method in parameterization. In addition, since the formula (2) is linear, following solutions regarding ($\Delta$v, $\Delta$w) are possible:

$$\Delta v=[(P-D_v(v,w)) \cdot D_w(v,w) D_v(v,w) \cdot D_v(v,w)-(P-D_v(v,w)) \cdot D_v(v,w) D_w(v,w) \cdot D_w(v,w)]/Det$$

$$\Delta w=[(P-D_v(v,w)) \cdot D_v(v,w) D_v(v,w) \cdot D_w(v,w)-(P-D_v(v,w)) \cdot D_w(v,w) D_v(v,w) \cdot D_v(v,w)]/Det$$

Here, Det is expressed by the following, and it is a determinant of coefficient matrix, which is obtained by expanding the formula (2):

$$Det = \begin{vmatrix} D_v(v,w) \cdot D_v(v,w) & D_w(v,w) \cdot D_v(v,w) \\ D_v(v,w) \cdot D_w(v,w) & D_w(v,w) \cdot D_w(v,w) \end{vmatrix}$$

The formulas (3) are sequentially subjected to parameter adjustment by the Newton method, aiming at ($\Delta$v, $\Delta$w)→(0, 0).

The initial value of the Newton method for the second time is set to be a parameter at the centroid of the parameter area, and in the computation from the second time, the initial value is set to be a parameter on the limit surface, which corresponds to the perpendicular foot in the previous computation. Therefore, in the computation from the second time, it is not necessary to make a search for a new parameter area, and the initial value is close to the parameter of the neighboring point, resulting in that dropping of the perpendicular line can be performed at much higher speed.

Here, according to Marinov and Kobbelt (non-patent document 7), Marinov and Kobbelt [19] disclose that it is necessary to consider the following conditional branching, with regard to the parameter ($\Delta v$, $\Delta w$).

1. When the parameter $(v+\Delta v, w+\Delta w)_i^j$ lies in the same parameter area, iteration of the Newton method is continued within the area;
2. When the parameter $(v+\Delta v, w+\Delta w)_i^j$ lies in another parameter area, neighboring the parameter area previously computed, $(v+\Delta v, w+\Delta w)_i^j$ is subjected to scaling by a coefficient $\lambda$, here, $0<\lambda<1$, so that $(v+\lambda\Delta v, w+\lambda\Delta w)_i^j$ lies exactly on the boundary of the current parameter area. This is because it is difficult to predict whether the update vector $(v+\lambda\Delta v, w+\lambda\Delta w)_i^{j+1}$ will be pointed in the same direction as the previous update vector or in the opposite direction; and
3. When the parameters $(v+\lambda\Delta v, w+\lambda\Delta w)_i^j$ lies already on the boundary, and belongs to the neighboring parameter area, the Newton method is performed within this area.

In general, if the parameter adjustment is performed according to the Newton method, and convergence proceeds, a distance between the initial control point and the surface becomes smaller. However, an expected parameter may not be obtained. In other words, there is a possibility of:

$$\|P_i - D(v,w)_i^{j+1}\| > \|P_i - D(v,w)_i^j\|$$

Generally, this indicates that a length of the update vector in the parameter adjustment is not correct, and this is a behavior common in the algorithm which aims at obtaining a root of multivariable function. In order to handle the case as such by a robust method, Brent method (non-patent document 8) is employed as a single variable optimization method with a high reliability, so as to obtain the minimum h in the following distance function g(h) between the initial control point and the surface:

$$g(h) = \|P_i - D(v,w)_i^{j+1} + hq_i^j\|, \epsilon(0,1)$$

Here, $$\|q_i^j\| = (\Delta v, \Delta w)_i^j$$

Ultimately, according to h obtained by the Brent method, the parameter is equal to:

$$(v + h\Delta v, w + h\Delta w)_i^j$$

Figure 14:
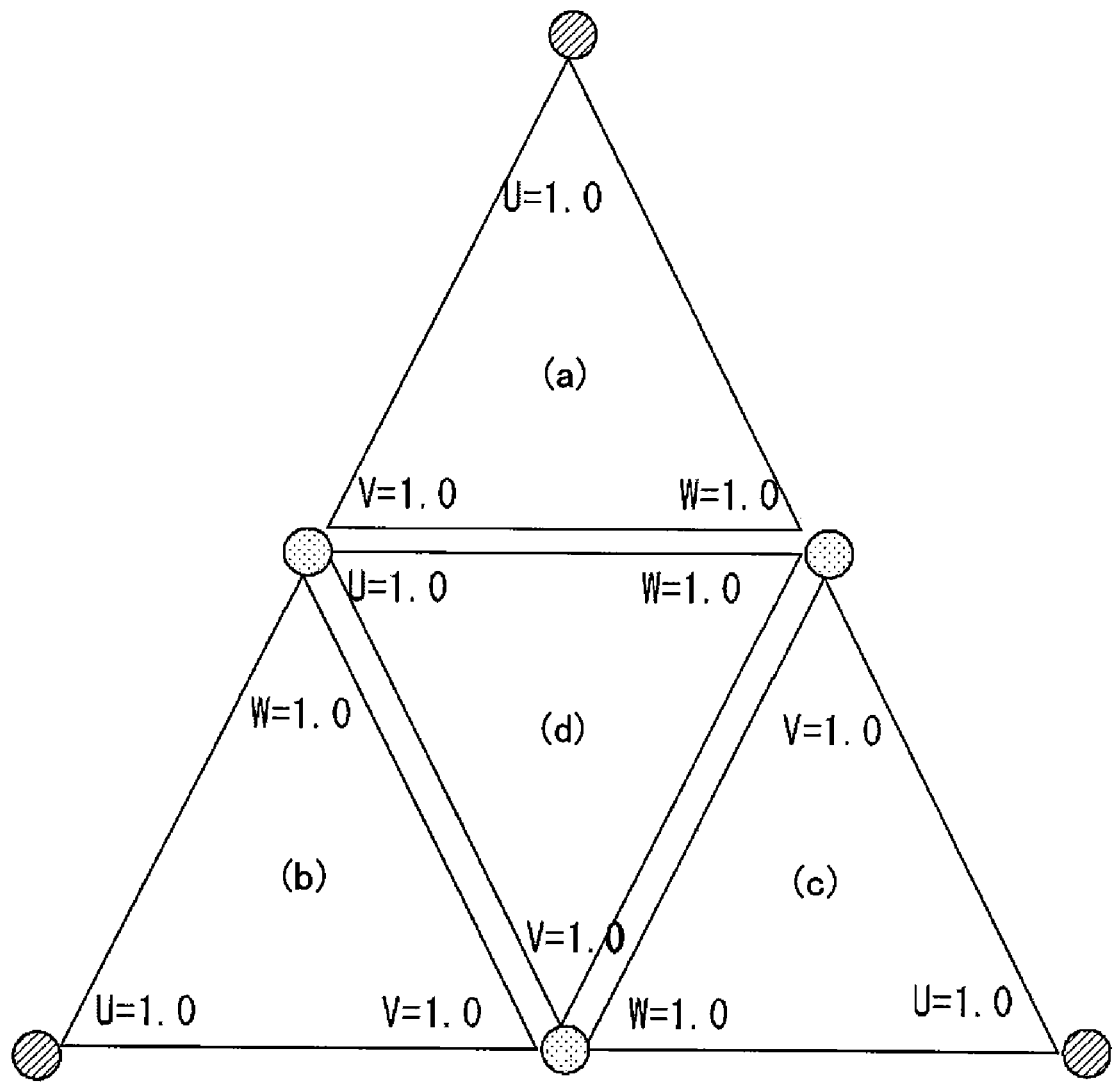
FIG. 14 schematically illustrates control points and surface to explain the case where a curve is generated by three-dimensional point group or control polygon mesh.

In here, a specific example of the parameter adjustment will be described. Firstly, a definition of an area coordinate system in each of the subdivision patches will be explained. FIG. 14 illustrates the area coordinate system on the subdivision patches. FIG. 14 illustrates the subdivision patches serving as the parameter area, and the shaded vertices (three vertices located at the outermost) are the points generated by the vertex subdivision (vertex points). The outline vertices (vertices on the sides of the triangle) are points generated by the area subdivision (edge points). In some cases, the vertices being diagonally shaded may become extraordinary points in order to hold the order before the subdivision, whereas the outline vertices become regular points with the order of six. In employing the Stam's theory, since the barycentric coordinate at the extraordinary point is defined as u=1.0, the algorithm is defined as shown in FIG. 14, considering a balance with the Half-Edge structure. Such ordering of the areas is not performed every time of the parameter adjustment, but it is performed in advance with respect to each surface.

Firstly, shifting within the same surface will be explained.

Figure 15A:
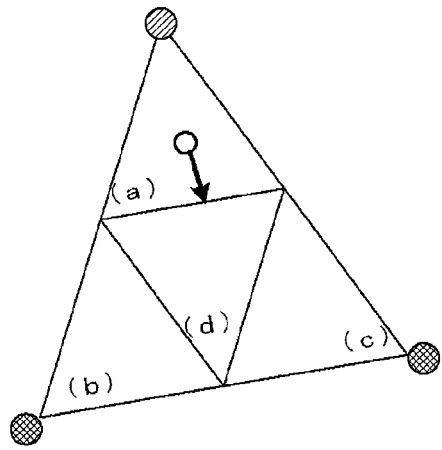
FIG. 15 schematically illustrates control points and surface to explain the case where a curve is generated by three-dimensional point group or control polygon mesh.
Figure 15B:
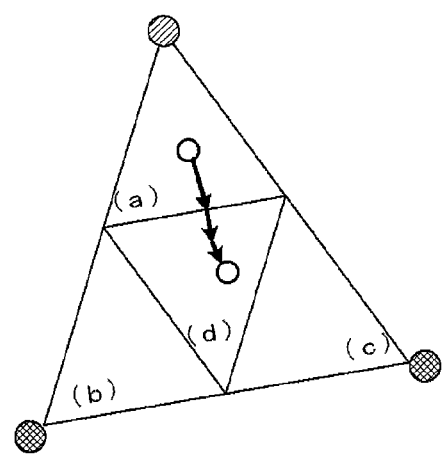

FIG. 15A and FIG. 15B illustrate the case where a target control point is an extraordinary point, and shifting between the parameter areas, each area being defined by one surface.

In FIG. 15A, the initial value of the Newton method is the parameter area which is the closest to the target control point ((a) in the figure). FIG. 14 shows the area coordinate system of each of the parameter areas (a) to (d).

There is shown that the parameter area is changed from the area (a) to the area (d), when u becomes u<0.0, i.e., v+w>1.0 according to the Newton method in the parameter area (a). For example, if v becomes v<0.0, the parameter area is changed to the area that is defined by the neighboring surface on the observer's right side. If w becomes w<0.0, the parameter area is changed to the area that is defined by the neighboring surface on the observer's left side. In addition, if u becomes u<0.0 according to the Newton method in the parameter area (d), the parameter area is changed to the area (c), and if w becomes w<0.0, the parameter area is further changed to the area (d).

Figure 15C:
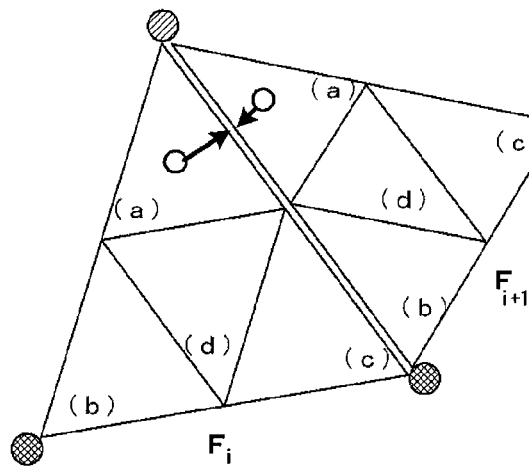
Figure 15D:
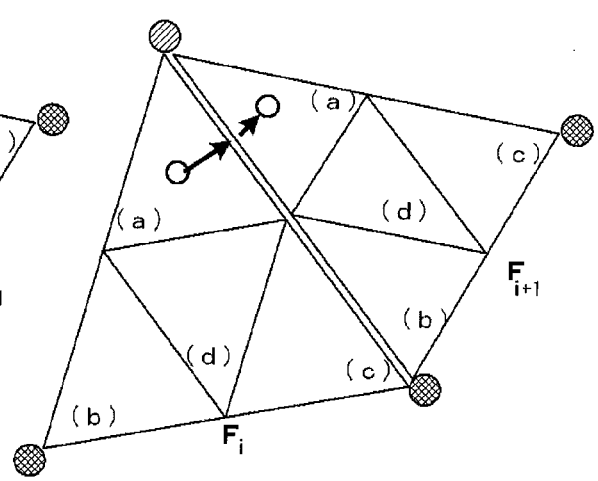

Next, shifting to the neighboring surface sharing the extraordinary point will be explained. FIG. 15C and FIG. 15D illustrate the case where a target control point is an extraordinary point, and shifting is performed to the parameter area that is defined by a neighboring surface.

If it comes into the situation that v<0.0 according to the Newton method in the parameter area (a), as shown in FIG. 15C, the parameter area is changed to the area defined by the neighboring surface on the observer's right side. Here, if the surface defining the parameter area previously subjected to the Newton method shares an identical extraordinary point with the neighboring surface being a shifting destination, the parameter areas (a), (b), (c), and (d) of the neighboring surface are uniquely determined.

Next, with reference to FIG. 16A and FIG. 16B, there will be explained a shifting to the neighboring surface which includes another extraordinary point, in addition to the extraordinary point being shared.

Figure 16A:
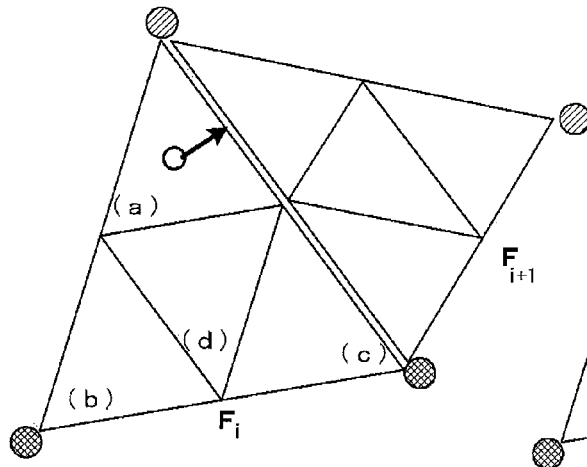
FIG. 16 schematically illustrates control points and surface to explain the case where a curve is generated by three-dimensional point group or control polygon mesh.
Figure 16B:
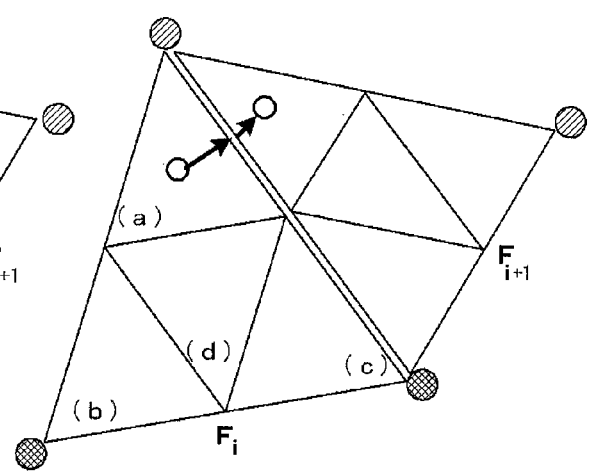

As shown in FIG. 16A and FIG. 16B, if the neighboring surface as a destination has another extraordinary point, in addition to the extraordinary being shared with the surface before the shifting, the parameter areas of the destination neighboring surface cannot be decided uniquely.

Figure 16C:
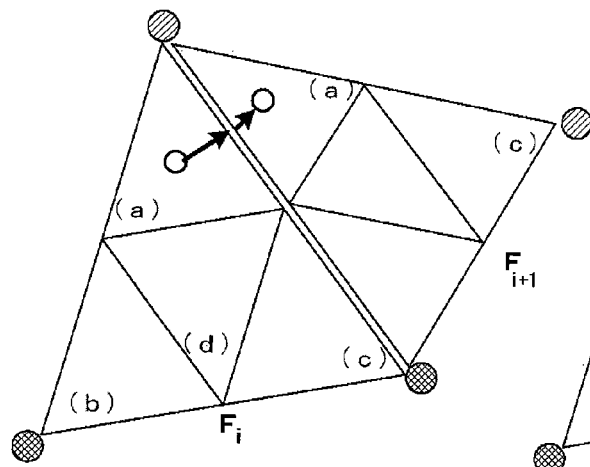
Figure 16D:
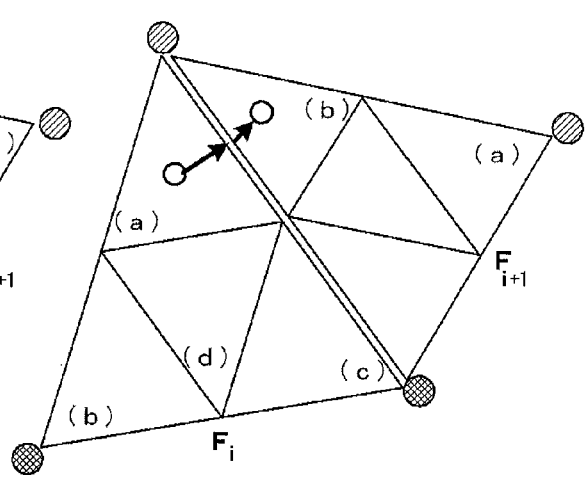

Ordering of the parameter areas is decided in advance, and for example, if there are two extraordinary points, there are two available ways of ordering as shown in FIG. 16C and FIG. 16D. Since the area coordinate system of the parameter area (d) is different between the two ordering ways, it is necessary to determine what kind of ordering is made for the parameter areas of the destination.

The first interpolation processing for obtaining a neighboring point, including the processing above, corresponds to the algorithm as described in the following.

STEP 1: When a perpendicular line is dropped from the control point to the limit surface, it is unpredictable to which surface patch the perpendicular line will be dropped. Therefore, the initial parameter area is assumed as the surface that is referred to for the first time according to the Half-Edge, and the subdivision is applied to the surface, whereby the parameter area (subdivision patch) is defined.

In addition, following the loop direction of the Half-Edge, the ordering of the parameter areas is determined (FIG. 14).

STEP 2: As an initial value of the Newton method, a parameter on the centroid of the parameter area is selected, which is at the closest position from the target control point (FIG. 12B).

STEP 3: A control point for defining the parametric surface in each of the parameter areas is selected. As shown in FIG. 11C to FIG. 11F, four control polygons are defined (these figures indicate the case where there are two extraordinary points).

STEP 4: According to the Stam's theory, a position on the surface and a differential amount by the current parameters are calculated, and based on these results and following the formulas (3), a parameter update amount ($\Delta v$, $\Delta w$) is obtained according to the Newton method, so that a new parameter (v,w) is calculated.

STEP 5: If the update vector ($\Delta v$, $\Delta w$) converges into a threshold, the point on the surface with that parameter is assumed as the neighboring point, and the process is terminated. If it does not converge, the procedure from step 6 is performed.

STEP 6: The position on the surface with the previous parameter and the position after the update are compared, and if a distance from the initial control point becomes larger, a correction is made according to the Brent method.

STEP 7: If the update induces the parameter (v, w) to go out of the parameter area, shifting to the other parameter area is performed, such as shifting to another parameter area that is defined by the currently belonging surface, or to the parameter area defined by the surface neighboring the currently belonging surface.

STEP 8: If there is no change of parameter area, the procedure returns to step 4, and the computation is iterated within the same parameter area. If the parameter area is changed, the procedure returns to step 3 to select a control point for the new parameter area.

Here, the convergence of the Newton method will be explained. In here, the convergence of the Newton method will be discussed, by indicating the number of iterations of the Newton method with respect to each offset. It is to be noted that in the computation of the Newton method from the second time, it is not necessary to make a search for a new parameter area, and therefore, the perpendicular line can be dropped more quickly.

Figure 17A:
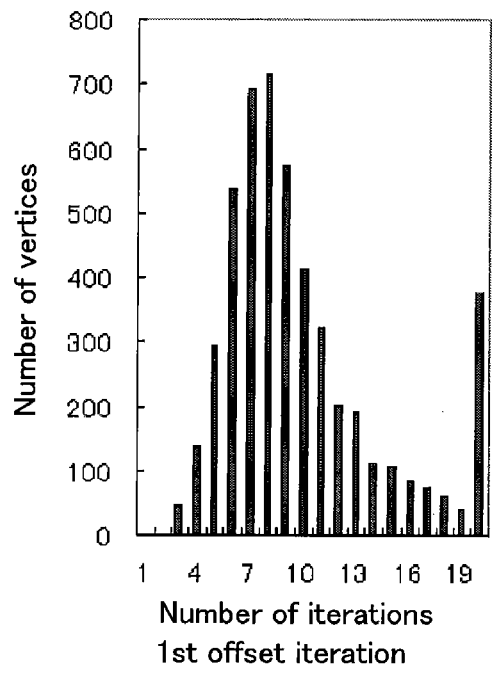
FIG. 17 illustrates histograms showing the number of vertices relative to the number of iterations in the Newton method for each offset.
Figure 17B:
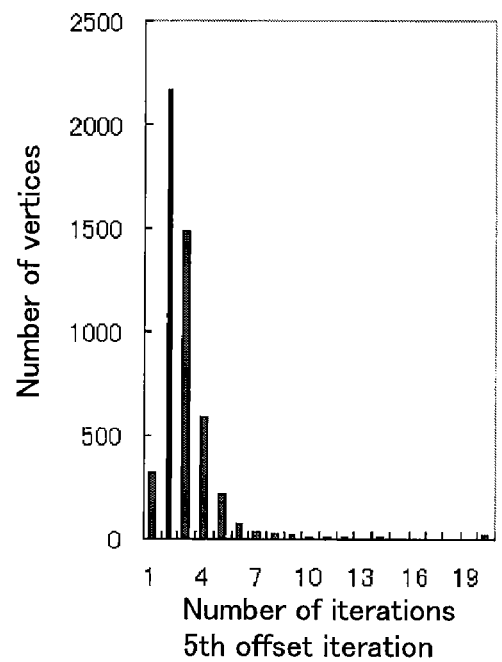
Figure 17C:
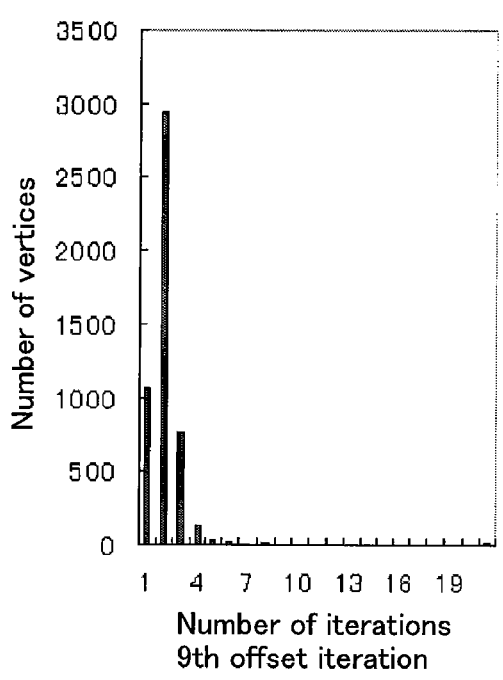

FIG. 17A to FIG. 17C are histograms showing the number of vertices relative to the number of iterations of the Newton method with respect to each offset, when a model (Happy Buddha model) with 4948 vertices is subjected to the subdivision surface interpolation.

Figure 17D:
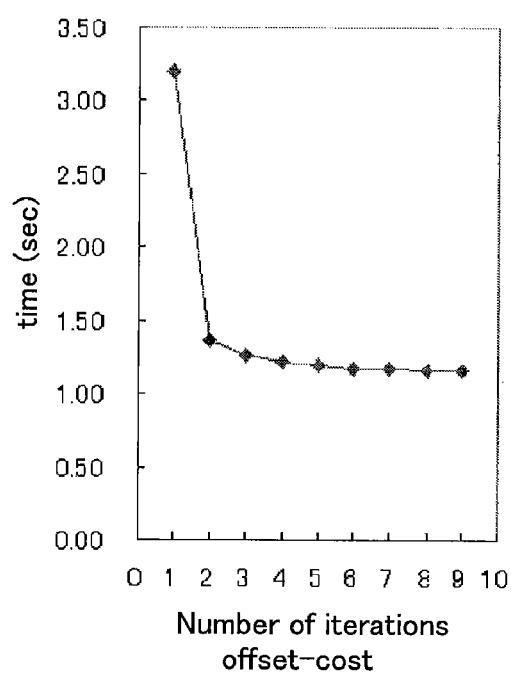

Since it is necessary to find a parameter area in the first-time offset, the Newton method is iterated approximately ten times on average. From the second time, approximately five times of iteration is needed for convergence, and from the ninth time, approximately two times of iteration is enough for convergence. In the graphs, there are some vertices that need twenty times of iteration, but in such a case, it is known empirically that there exists more than one points to which the perpendicular line may drop, in general. For example, if there is more than one perpendicular lines to be taken, according to the positional relationship between the initial control point and the surface, oscillations may occur among the multiple points as candidates of the perpendicular foot in the Newton method. Therefore, convergence into only one of them will never happen. In addition, FIG. 17D shows variations of the computational time relative to the number of interpolating iterations.

According to the interpolation algorithm of the present invention, as known from the graphs of FIG. 17, if the number of offset times increases, the number of points that need iterations becomes extremely small. In addition, as the number of vertices constituting the initial polygon mesh becomes more, the number of such points that need iterations becomes much smaller. Therefore, even if any of the candidate points for the perpendicular foot is treated, it is considered that there is little influence on the quality of the surface.

Therefore, the interpolation algorithm of the present invention has a superior convergence, and by offsetting the control points through a few times of interpolation processing, it is possible to generate a highly precise interpolation curve. It is to be noted here that a shape having a sharp corner shows a tendency that the convergence proceeds slower than a smooth part. In order to handle such pointed part, firstly, the interpolation curve is generated by overall offsetting, and only the vertices showing slow convergence are selected next. Then, the offset is iterated locally, thereby allowing the interpolation curve to be finalized with a high degree of precision.

Next, the second interpolation processing will be explained, which offsets the control points according to the present invention.

As shown in FIG. 3B, the offset vector (update vector) $V_{u\pm}$ is defined as the following, according to the sign of the inner product of the unit normal vector N and the distance vector $Vd(=P_i-f_i)$; $N \cdot Vd = (N \cdot P_i - f_i)$ as the following:

$$(N \cdot (P_i-f_i)) > 0: V_{u+}$$

$$(N \cdot (P_i-f_i)) < 0: V_{u-} \qquad (4)$$

Q offset vector is expressed as:

$$V_{u\pm} = (N - (P_i-f_i))N \qquad (5)$$

Therefore, by adding this vector to the current position of the control point, a new control point position after the offset can be obtained as the following:

$$P_i^{(k+1)} = P_i^{(k)} + V_{u\pm}$$

It is to be noted that FIG. 3 shows the example two-dimensionally. However, also in interpolating a three-dimensional surface, the vertices, showing slow convergence and failed in the high-precise interpolation, are subjected to local offsetting iteratively, thereby enabling the surface interpolation with a high degree of precision.

Next, there will be explained an analytical demonstration regarding the convergence of the interpolation processing according to the present invention, and examples of convergence in actual models will be shown in the following.

Here, a two-dimensional uniform B-Spline curve is employed to carry out the analysis, assuming a midpoint of the curve as the foot of a perpendicular line. This analysis may also be applied to a B-Spline surface and a subdivision surface.

The two-dimensional uniform B-Spline curve is defined as the following:

$$r(t) = P_{j-1}N_0(t) + P_j N_1(t) + P_{j+1}N_2(t) \qquad (6)$$

Here, $P_{j-1}$, $P_j$, and $P_{j+1}$ represent control points, $N_0(t)$, $N_1(t)$, and $N_2(t)$ represent base functions in the two-dimensional B-Spline which is given in the following:

$$N_0(t) = 1/2(1-t)^2, N_1(t) = 1/2 + t - t^2, N_2(t) = 1/2 t^2 \qquad (7)$$

Here, if the perpendicular foot from the control point $P_j$ to the curve is assumed as the midpoint of the curve, it is expressed as the following:

$$f_j^{(1)} = r(1/2) = 1/8(P_{j-1} + 6P_j + P_{j+1}) \qquad (8)$$

The distance vector between the control point $P_j$ and the perpendicular foot $f_j^{(1)}$ is given by the following formula:

$$d_j^{(1)} = P_j - f_j^{(1)} = 1/8(-P_{j-1} + 2P_j - P_{j+1}) \quad (9)$$

A position of the new control point corresponds to the position obtained by adding the distance dj up to the curve, to the current control point position, and therefore, it is given by the following formula:

$$P_j^{(2)} = P_j^{(1)} + d_j^{(1)} = 1/8(-P_{j-1} + 10P_j - P_{j+1}) \quad (10)$$

Similarly, following formulas are obtained:

$$P_{j-1}^{(2)} = P_{j-1} + d_{j-1}^{(1)} = 1/8(P_{j+2} + 10P_{j-1} - P_j) \quad (11)$$

$$P_{j+1}^{(2)} = P_{j+1} + d_{j+1}^{(1)} = 1/8(P_j + 10P_{j+1} - P_{j+2}) \quad (12)$$

According to the formula (8), the new perpendicular foot is expressed by:

$$f_j^{(2)} = 1/8(P_{j-1}^{(2)} + 6P_j^{(2)} + P_{j+1}^{(2)}) \quad (13)$$

Then, the distance vector can be obtained as the following:

$$d_j^{(2)} = 1/8(P_{j-1}^{(2)} + 6P_j^{(2)} + P_{j+1}^{(2)}) \quad (14)$$

This geometric process is iterated until the distance vector becomes smaller than a certain threshold.
Table 1 shows coefficients of the distance vector until the fifth time of offset.

TABLE 1

| k | $P_{j-5}$ | $P_{j-4}$ | $P_{j-3}$ | $P_{j-2}$ | $P_{j-1}$ | $P_j$ | $P_{j+1}$ | $P_{j+2}$ | $P_{j+3}$ | $P_{j+4}$ | $P_{j-5}$ |
|---|---|---|---|---|---|---|---|---|---|---|---|
| 1 | | | | | $-\frac{1}{8}$ | $\frac{2}{8}$ | $-\frac{1}{8}$ | | | | |
| 2 | | | | $\frac{1}{8^2}$ | $-\frac{4}{8^2}$ | $\frac{6}{8^2}$ | $-\frac{4}{8^2}$ | $\frac{1}{8^2}$ | | | |
| 3 | | | $-\frac{1}{8^3}$ | $\frac{6}{8^3}$ | $-\frac{15}{8^3}$ | $\frac{20}{8^3}$ | $-\frac{15}{8^3}$ | $\frac{6}{8^3}$ | $-\frac{1}{8^3}$ | | |
| 4 | | $\frac{1}{8^4}$ | $-\frac{8}{8^4}$ | $\frac{28}{8^4}$ | $-\frac{56}{8^4}$ | $\frac{70}{8^3}$ | $-\frac{56}{8^4}$ | $\frac{28}{8^4}$ | $-\frac{8}{8^4}$ | $\frac{1}{8^4}$ | |
| 5 | $-\frac{1}{8^4}$ | $\frac{10}{8^4}$ | $-\frac{45}{8^4}$ | $\frac{120}{8^4}$ | $-\frac{210}{8^4}$ | $\frac{252}{8^3}$ | $-\frac{210}{8^4}$ | $\frac{120}{8^4}$ | $-\frac{45}{8^4}$ | $\frac{10}{8^4}$ | $-\frac{1}{8^4}$ |

Recursively, the next recurrence formula is obtained:

$$d_j^{(k)} = \frac{1}{8^k} \sum_{i=0}^{2k} (-1)^{i+k} \binom{2k}{i} P_{j+i-k} \quad (15)$$

In the formula (15), it is expected that the distance vector converges to zero as the k increases. Since $P_{j(i=k)}$ is the largest coefficient, the convergence of this coefficient will be studied here. The coefficient of $P_j$ for the k-th time of offset is expressed as the following:

$$\{a_k\} = \frac{\binom{2k}{k}}{8^k} \quad (16)$$

The ratio between the above coefficient and the coefficient for the (k+1)th time is expressed as:

$$a_{k+1}/a_k = (2k+1)/(4(k+1)) \quad (17)$$

This indicates that the formula (15) is converging. If k becomes infinite consequently, the formula (15) shows the convergence into zero. Therefore, it is demonstrated that the geometric algorithm of the interpolation processing according to the present invention interpolates the initial polygon.

Next, examples of the convergence in actual models will be explained.

Figure 18:
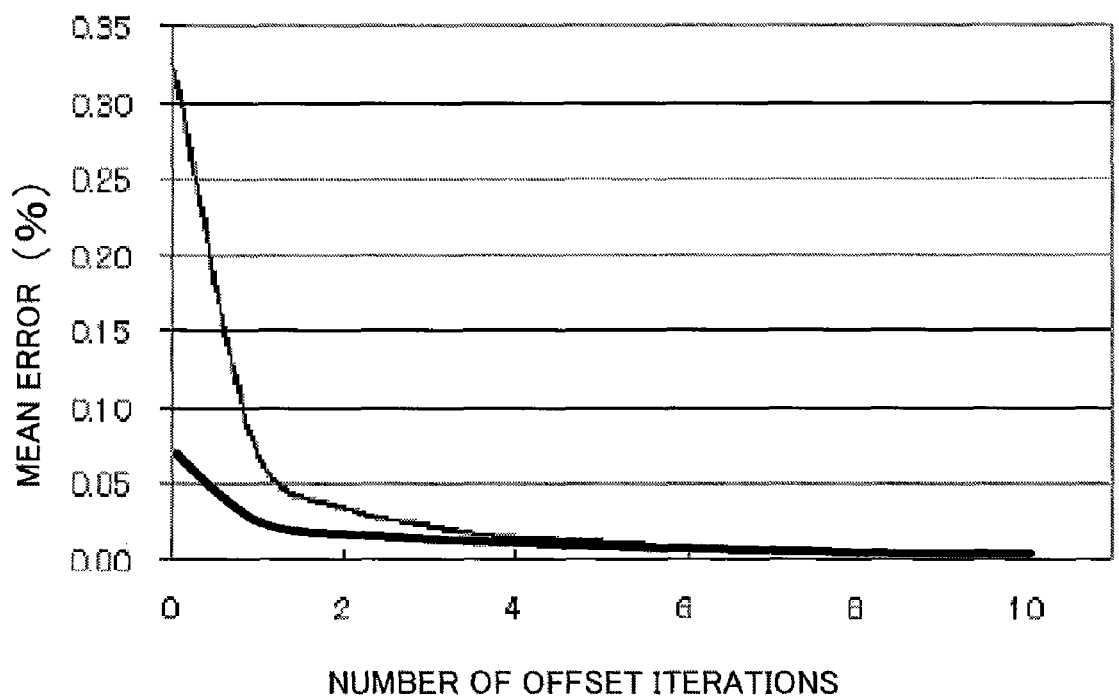
FIG. 18 is a diagram showing variations of an error relative to the number of offset iterations in one model.
Figure 19:
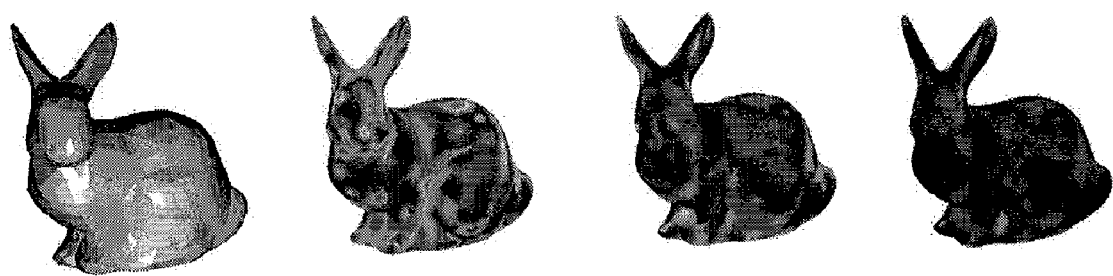
FIG. 19 illustrates an example of bunny model with 562 vertices.

FIG. 18 shows variations of error with respect to the number of offset iterations in one model. In FIG. 18, the thin solid line represents an example with 562 vertices, and the thick solid line represents an example with 4988 vertices. It is to be noted here that the model shown here is an example of bunny model as shown in FIG. 19, with 562 vertices. Evaluation was made as to the error, utilizing an average squared distance error, which averages a ratio of the distance between the vertices and the interpolation surface, to the diagonal line of a bounding box (a minimum rectangular parallelepiped containing the model).

For such coarse bunny model with 562 vertices, it is possible to reduce the error ratio approximately to 0.05%, by one-time offset. On the other hand, as for the model with 4988 vertices, the error reduction rate is not drastic since the original shape is represented in detail by the large number of vertices. However, just a few times of offset enable both of above cases to achieve a sufficiently high degree of precision. In the conventional method, many times of parameter adjustments and fitting optimizations are carried out, but according to the interpolation processing of the present invention, just a few times of offset enables a highly precise surface interpolation, with a high convergence.

The interpolation processing according to the present invention not only performs the interpolation by offsetting the overall control polygon as described above, but also has another function as the following: If there is a part of a surface which is slow in convergence and failed in highly precise interpolation, the interpolation processing of the present invention iterates the offset of the control point locally for the part to influence the surface, so as to achieve an improvement of precision.

With such a local offsetting, the shape can be processed, excluding a part that has been successfully interpolated with a sufficiently high degree of precision, resulting in that the time for generating the surface can be reduced.

Figure 20A:
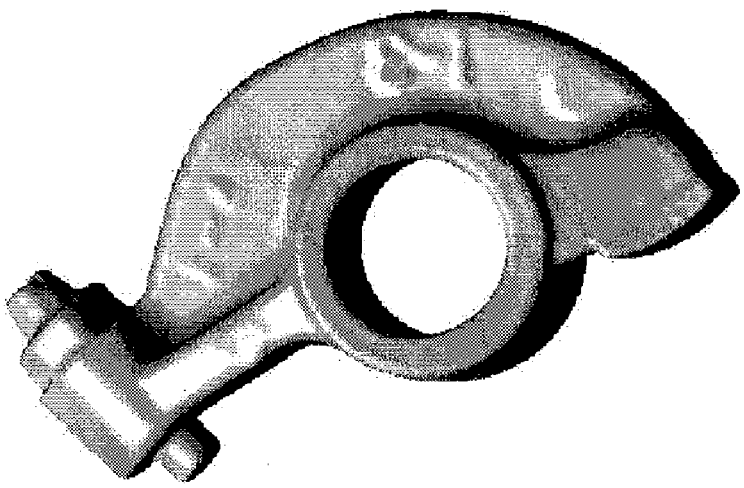
FIG. 20 illustrates an example of a result of the interpolation processing according to the present invention.
Figure 20B:
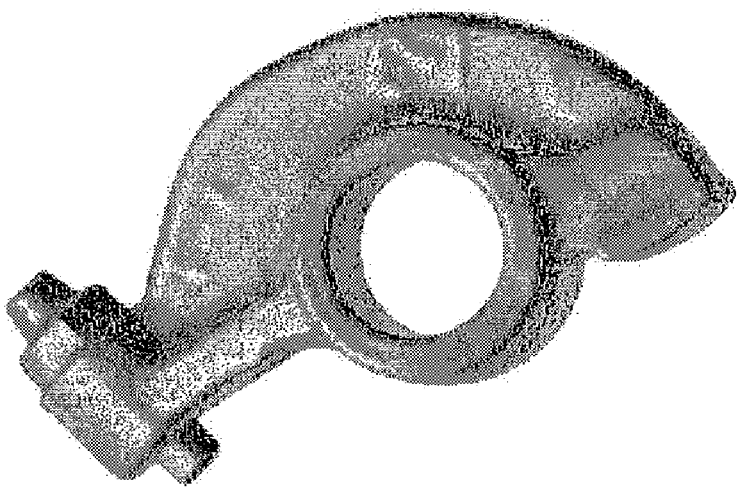
Figure 20C:
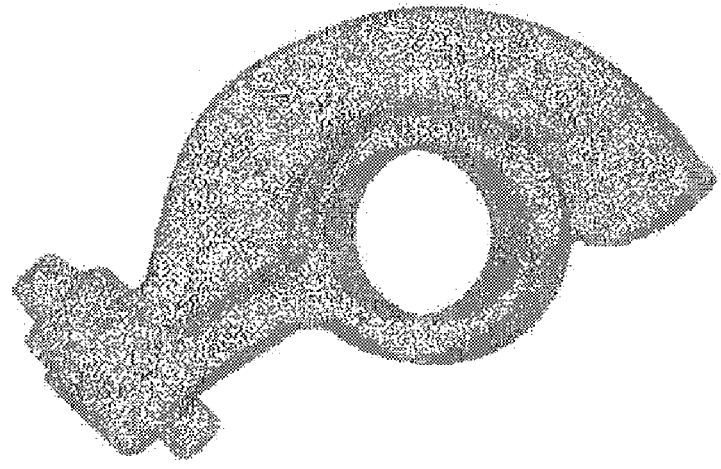
Figure 21A:
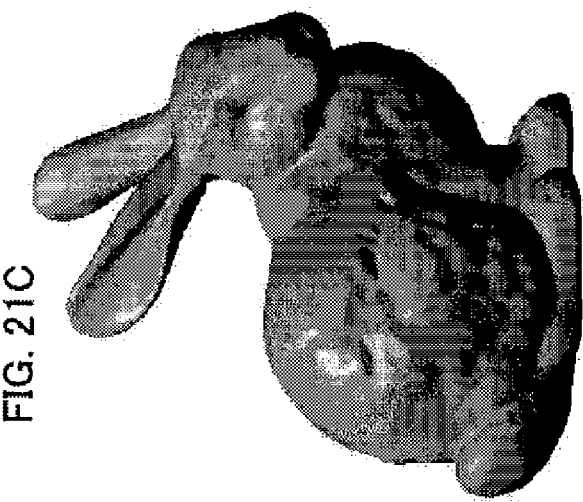
FIG. 21 illustrates an example of a result of the interpolation processing according to the present invention.
Figure 21B:
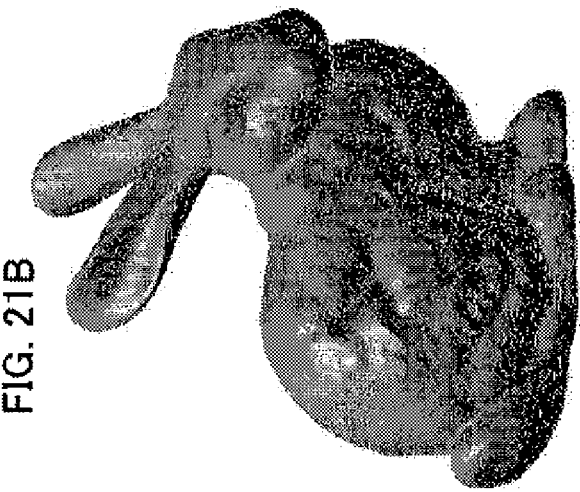
Figure 21C:
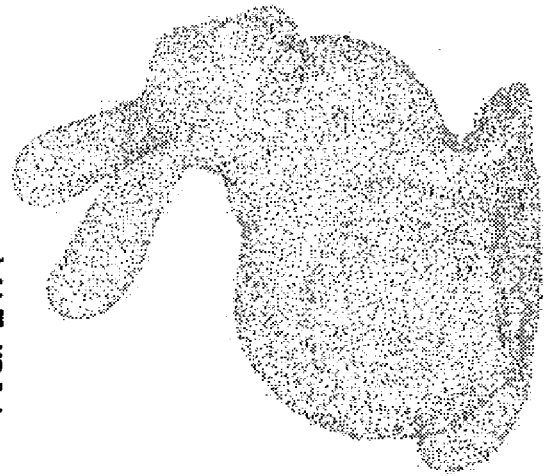
Figure 22A:
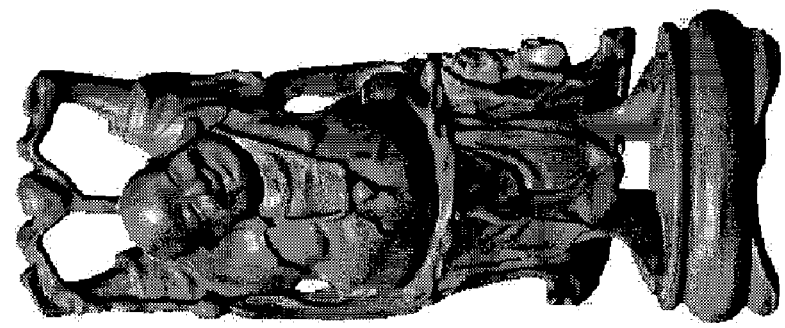
FIG. 22 illustrates an example of a result of the interpolation processing according to the present invention.
Figure 22B:
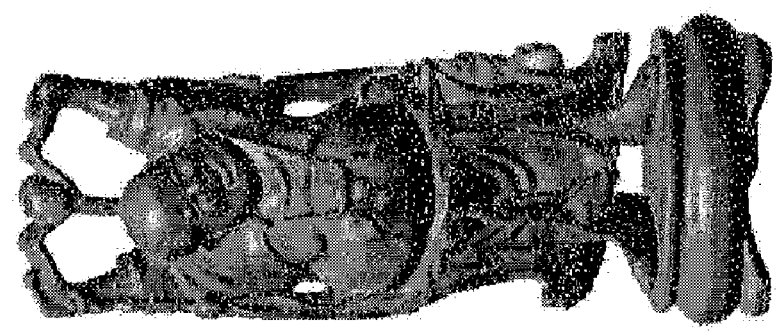
Figure 22C:
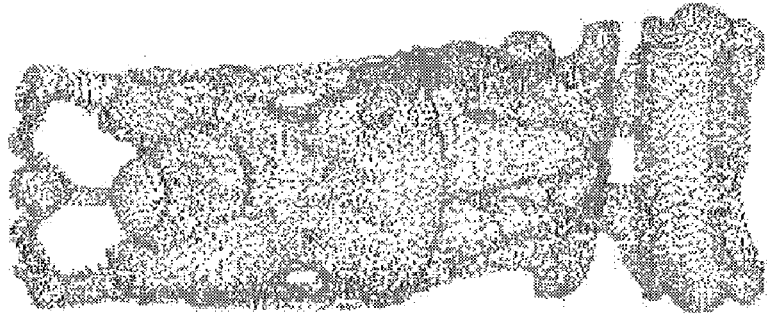

FIG. 20 to FIG. 22 illustrate examples of the interpolation processing results according to the present invention. FIG. 20 is an example of Rocker-Arm, referring to http://Cyberware/ samples.

FIG. 21 is an example of Stanford Bunny and FIG. 22 is an example of Happy Buddha, referring to http://graphics.stanford.edu/data/3Dscanrep/.

Each of the figures shows the initial mesh being input, the initial mesh and the subdivision surface being interpolated, and the interpolated subdivision surface.

The following table 2 shows the number of interpolated vertices, the total number of offset iterations, the maximum error, the average error, and the computation time, as to each of the above figures.

TABLE 2

| Model | No. of Interpolated Vertices | Offset Iterations | Maximum Squared Distance Error (%) | Average Squared Distance Error (%) | Computation time s |
|---|---|---|---|---|---|
| Stanford Bunny | 9987 | 3 | 0.0498 | 0.0093 | 23 |
| Rocker-Arm | 30107 | 2 | 0.0499 | 0.0080 | 50 |
| Happy Buddha | 29986 | 2 | 0.0499 | 0.0060 | 60 |

FIG. 23 shows examples of the interpolation result, and these are examples of torus. FIG. 23A is an illustration of mesh representing a coarsely polygonized torus. FIG. 23B shows an interpolation result obtained by a conventional interpolation. FIG. 23C shows an interpolation result obtained by the interpolation according to the present invention. FIG. 23D represents a relationship between the torus obtained by the interpolation and the control polygon.

Figure 23A:
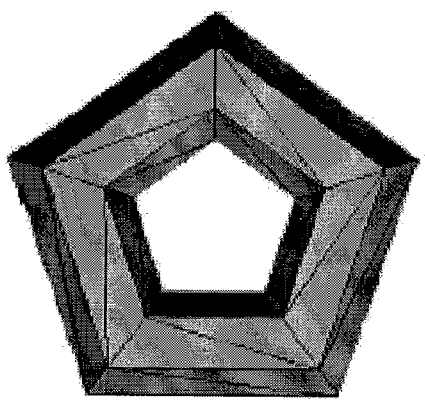
FIG. 23 illustrates an example of the interpolation results.
Figure 23B:
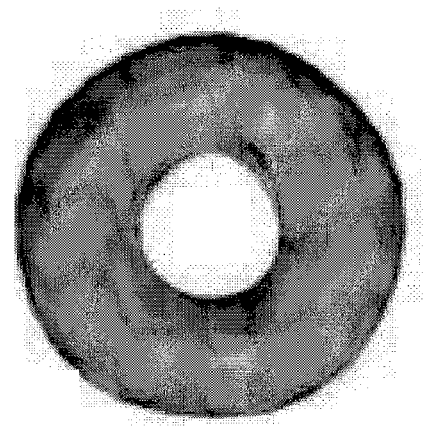
Figure 23C:
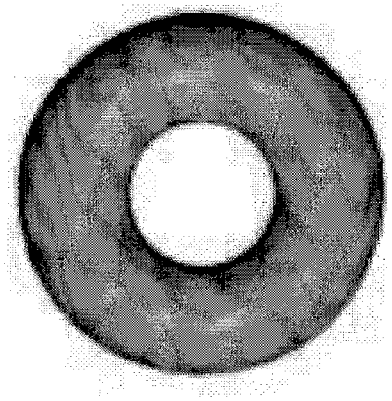
Figure 23D:
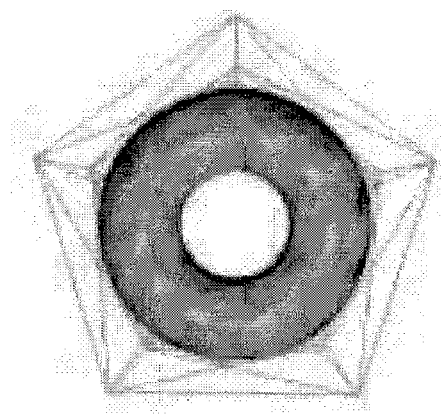

It is recognized that undulations occur in the torus obtained by the conventional interpolation as shown in FIG. 23B. On the other hand, in the torus obtained by the interpolation according to the present invention does not include any undulations, and a smooth shape can be obtained.

As shown in FIG. 23, according to the interpolation processing of the present invention, it is possible to resolve the problem of undulation occurrence, which is found in the conventional interpolation processing.

Figure 24:
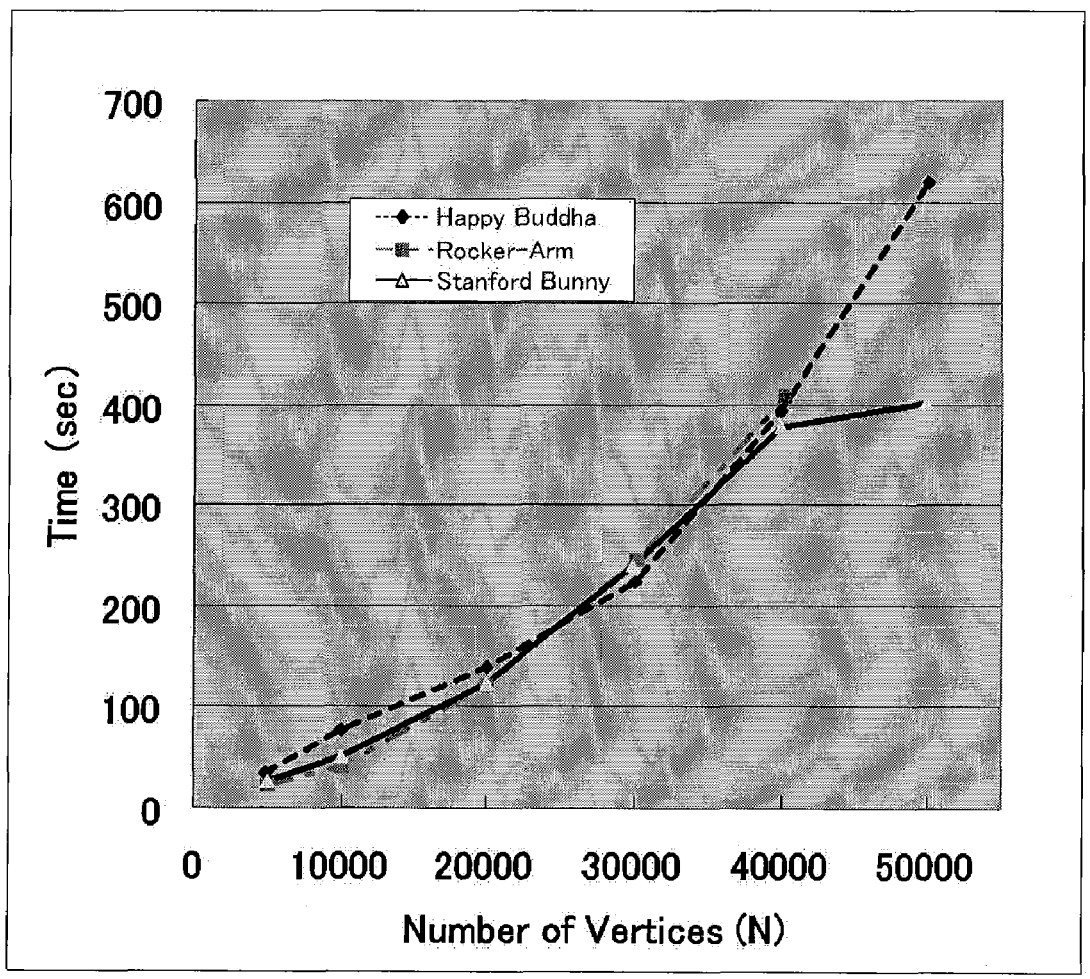
FIG. 24 is a diagram showing the computation time relative to the number of interpolated vertices according to the present invention.

FIG. 24 shows the computation time relative to the number of interpolated vertices. The computational cost of the interpolation processing according to the present invention is considered to be O(NM), which is a product of the number of vertices N and the total offset iterations M. It is possible to recognize such linearity from the graph as shown in FIG. 21. A CG method (Conjugate Gradient Method), SVD (Singular Value Decomposition), and the like, are taken as examples of solution by the conventional surface fitting method, and the computational cost for these methods corresponds to O(N) to O(N2). The total number of offset iterations in the interpolation processing of the present invention indicates M<<N, though it may be variable depending on the degree of details of the input polygon mesh and complexity of the shape. Therefore, the computational cost can be reduced or at least to be at the same level, if compared with the conventional methods.

If the interpolation processing of the present invention and the conventional interpolation processing are compared, from the viewpoint of a relationship between the processing time and undulation occurrence, the interpolation processing of the present invention is able to perform processing without generating undulations, at a high speed of the same level, or even at a higher speed depending on conditions. If a fairing process to remove the undulations after the conventional interpolation processing is taken into account, the present invention achieves sufficiently high speed processing.

For example, in order to make the shape error after the correction to be around 0.01% to 0.05%, the interpolation processing of the present invention is able to complete the processing within the time shorter than or approximately equal to the time of the conventional interpolation processing. If it is desired that the shape error has to be the degree of less than 0.01%, the interpolation processing of the present invention may need a longer processing time than the conventional interpolation processing, but a preferable interpolation result can be obtained without generating any undulations.

In the above descriptions, the Loop subdivision surface interpolation is employed for explanation. However, even when the Catmull-Clark subdivision surface is used, exactly the same algorithm can be applied for the surface interpolation. In addition, the interpolation is available for a planar curve, and the interpolation processing of the present invention can be effectively applied to a curve and a surface, which are defined by control points.

Next, a shape evaluation method of the subdivision surface will be explained.

A geometric evaluation of a surface can be represented by a normal vector or a curvature of the surface.

On a parametric surface r=r(u,v), the arc length ds is expressed as the following:

$$ds = |ru \cdot du/dt + rv \cdot dv/dt|dt \quad (18)$$
$$= (Edu^2 + 2Fdudv + Gdv^2)^{1/2}$$

Here, ru represents a partial differentiation as to the parameter u, and rv represents a partial differentiation as to the parameter r. E, F, and G are referred to as the first fundamental form coefficients, and expressed as the following:

$$E=ru \cdot ru, F=ru \cdot rv, G=rv \cdot rv \quad (19)$$

The first fundamental form (arc length I) is expressed as the following:

$$I=ds^2=Edu^2+2Fdudv+Gdv^2 \quad (20)$$

The normal curvature κ is expressed as the following:

$$\kappa=(Ldu^2+2Mdudv+Ndv^2)/(Edu^2+2Fdudv+Gdv^2) \quad (21)$$

The numerator of the formula (21) is referred to as a second fundamental form.

Here, L, M, and N are referred to as the second fundamental form coefficients and expressed by:

$$L=ruu \cdot N, M=ruv \cdot N, G=rvv \cdot N \quad (22)$$

If it is assumed that λ=du/dv, the normal curvature κ is expressed as the following:

$$\kappa=(L+2M\lambda+N\lambda^2)/E+2F\lambda+G\lambda^2) \quad (23)$$

When the extreme values κ1 and κ2 of the normal curvature κ are obtained, those values are expressed as the following:

$$\kappa K1 = H+(H^2-K)^{1/2} \quad (24)$$

$$\kappa 2 = H-(H^2-K)^{1/2} \quad (25)$$

Here, κ1 represents a maximum principal curvature and κ2 represents a minimum principal curvature. In the above formulas, K represents Gaussian curvature, and H represents a mean curvature.

A direction in which the normal curvature takes the maximum value or the minimum value on the tangent plane is a principal direction, and the principal direction of the maximum and the minimum principal curvatures on the uv plane is expressed by either of the following formulas:

$$\lambda=(L-\kappa nE)/(M-\kappa nF) \quad (26)$$

$$\lambda=(M-\kappa nF)/(N-\kappa nG) \quad (27)$$

Here, by substituting κ1 or κ2 for κn, λ is obtained, respectively corresponding to the maximum principal curvature and the minimum principal curvature.

Conversion into the three-dimensional space can be carried out according to the following formula:

$$p=(ru+\lambda rv)/|ru+\lambda rv| \quad (28)$$

Therefore, the maximum principal curvature κ1 or the minimum principal curvature κ2 on the uv plane of the surface (u,v) are substituted for κ in the aforementioned computational formulas (24), (25), and (28), so as to perform the conversion processing from the uv plane to the three-dimensional space by either by the programs and the operation circuits. Then, the obtained value p is output as an evaluation value for evaluating the principal direction of the subdivision surface in the three-dimensional space, whereby the shape evaluation of the subdivision surface can be carried out.

Figure 25:
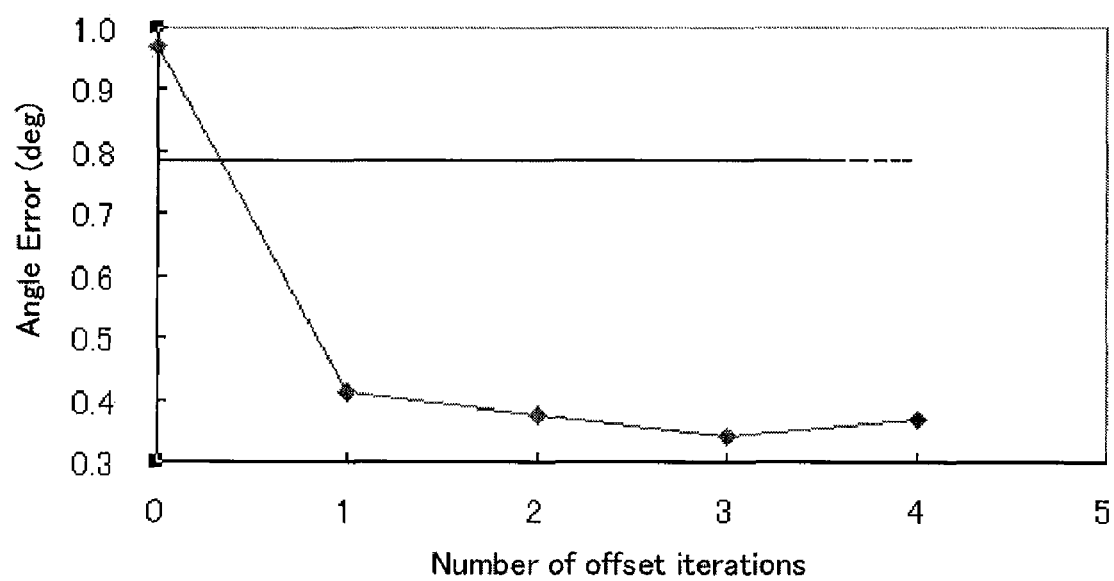
FIG. 25 is a diagram showing an error of a normal vector, for each offset, the normal vector being obtained by the interpolation processing according to the present invention.

FIG. 25 shows errors with respect to each of the offset iterations, regarding the normal vector obtained by the interpolation processing of the present invention. In addition, a result obtained by the Angle Weighted method (approximately 0.78 degrees) is also shown for comparison.

When the normal vector was obtained without any offset, in other words, if the normal vector was obtained on the limit surface defined by the initial polygon, an error compared to the analytic solution was approximately 0.97 degrees. However, if once the offset was performed, the error was able to be reduced to approximately 0.35 degrees.

Even after the offset was iterated more than one, there was no apparent improvement of precision. This is because in the case where the shape is simple or the polygons are not coarse, only one-time offset achieves a sufficient reduction of the error between the initial polygon and the limit surface.

In addition, in the Angle Weighted method, a mean error when compared with the analytical solution was approximately 0.78 degrees. This method has relatively a high precision, and it is more effective than other methods, when the interpolation processing of the present invention obtains a normal vector of the polygon mesh.

Industrial Applicability

The present invention can be applied to a reverse engineering in the field of 3D modeling.

What is claimed is:

1. An interpolation processing method for interpolating a point group by a curve or a surface defined by a control point, providing the point group as an initial control point, comprising,
    a first interpolation step for performing a geometric algorithm operation to obtain a point on the curve or the surface, as a neighboring point, being located adjacent to the initial control point of a control polygon and
    a second interpolation step for performing a geometric algorithm operation for effecting a shift of the control point from a position of the control point, in a normal direction of the curve or surface at the neighboring point, by a distance between the neighboring point and the initial control point, and defining a position after the shift as a new position of the control point, the control point is renewed one after another by the first interpolation step and the second interpolation step, wherein,
    an operation means which incorporates the geometric algorithms, performs the operation.

2. The interpolation processing method according to claim 1, wherein,
    the first interpolation step obtains a point on the curve or the surface as the neighboring point, which is located at the shortest distance from the initial control point, according to the geometric algorithm operation.

3. The interpolation processing method according to claim 1, wherein,
    the first interpolation step obtains as the neighboring point, a midpoint on the curve, or a center point or a centroid within an area defined on the surface, according to the geometric algorithm operation.

4. The interpolation processing method according to claim 1, wherein,
    the first interpolation step performs a geometric algorithm operation for dropping a perpendicular line from the initial control point to the curve or the surface defined by the control polygon, and assuming that a position of a perpendicular foot on the curve or on the surface as the neighboring point, and
    the second interpolation step performs a geometric algorithm operation for obtaining a distance between the perpendicular foot and the initial control point, assuming a direction of the perpendicular line as a normal direction, shifting by the distance, the control point defining the curve or the surface at the present time, in the normal direction of the curve or the surface, and defining a position after shifting as a new position of the control point.

5. The interpolation processing method according to claim 1, wherein,
    the curve or the surface is obtained based on the control point acquired in the operations,
    a distance between an interpolation point being the initial control point and the curve or the surface being obtained is compared with a threshold, and
    the first interpolation step and the second interpolation step are iterated, until the distance satisfies the threshold or becomes smaller than the threshold.

6. The interpolation processing method according to claim 5, wherein, the distance to be compared with the threshold is an average error or a maximum error, of the distance between the perpendicular foot of each initial control point and the interpolation point being an initial control polygon, corresponding to the control point.

7. The interpolation processing method according to claim 1, wherein, in the first interpolation step and the second interpolation step for the first time, the geometric algorithm operation is performed, assuming the point group as an initial control polygon and assuming this initial control polygon as the control polygon, and from the second time of the first interpolation step and the second interpolation step, the geometric algorithm operation is performed, assuming the control point obtained by the interpolation steps as the control polygon.

8. The interpolation processing method according to claim 1, wherein,
    the surface is defined by the control point that is determined by any of the subdivisions; B-Spline surface, Loop subdivision using a triangular mesh, and Catmull-Clark subdivision or Doo-Sabin subdivision using a quadrilateral mesh.

9. The interpolation processing method according to claim 1, wherein,
the curve is defined by the control point that is determined by either of Chaikin subdivision and B-Spline curve.

10. An interpolation processing device for interpolating a point group by a curve or a surface defined by a control point providing the point group as an initial control point, comprising,
a first geometric operation means for performing a first interpolation step according to a geometric algorithm to obtain a point on the curve or the surface, as a neighboring point, being located adjacent to the initial control point of a control polygon, and
a second geometric operation means for performing a second interpolation step according to a geometric algorithm for effecting a shift of the control point from a position of the control point, in a normal direction of the curve or surface at the neighboring point, by a distance between the neighboring point and the initial control point, and defining a position after the shift as a new position of the control point, the control point is renewed one after another by the first interpolation step and the second interpolation step, wherein,
the first geometric operation means and the second geometric operation means comprise a CPU and a storage for executing each of the geometric algorithms according to software, or a circuit for executing each of the geometric algorithms according to hardware.

11. The interpolation processing device according to claim 10, wherein, the first geometric operation means comprises a program or a circuit configuration for obtaining a point on the curve or the surface as the neighboring point, which is located at the shortest distance from the initial control point, according to a geometric algorithm operation.

12. The interpolation processing device according to claim 10, wherein, the first geometric operation means comprises a program or a circuit configuration for obtaining as the neighboring point, a midpoint on the curve, or a center point or a centroid within an area defined on the surface, according to a geometric algorithm operation.

13. The interpolation processing device according to claim 10, wherein the first geometric operation means comprises a program or a circuit configuration for performing a geometric algorithm operation which drops a perpendicular line from each initial control point of an initial control polygon to the curve or the surface defined by the control polygon, and assuming that a position of a perpendicular foot on the curve or on the surface as the neighboring point, and the second geometric operation means comprises a program or a circuit configuration for performing a geometric algorithm operation for obtaining a distance between the perpendicular foot and the initial control point, assuming a direction of the perpendicular line as a normal direction, shifting by the distance, the control point defining the curve or the surface at the present time in the normal direction from the curve or the surface, and defining a position after shifting as a new position of the control point.

14. The interpolation processing device according to claim 10, comprising a control means including a program or a circuit configuration which allows to execute the following steps for;
obtaining the curve or the surface based on the control point acquired in the operations,
comparing a distance between an interpolation point being the initial control point and the curve or the surface being obtained, with a threshold, and
iterating the first geometric operation means and the second geometric operation means, until the distance satisfies the threshold or becomes smaller than the threshold.

15. The interpolation processing device according to claim 14, wherein, the control means comprises a program or a circuit configuration for geometrically calculating an average squared distance or a maximum squared distance between a perpendicular foot at each initial control point and an interpolation point being the initial control point.

16. The interpolation processing device according to claim 10, wherein, the first geometric operation means and the second geometric operation means comprises a program or a circuit configuration for executing the following; in the first time of a geometric operation, the point group is input as an initial control polygon, and a geometric algorithm operation is performed, assuming the initial control polygon as the control polygon, and from the second time of the geometric operation, the geometric algorithm operation is performed, assuming the control point obtained in the interpolation steps as the control polygon.

17. The interpolation processing device according to claim 10, comprising a program or a circuit configuration for defining the surface by the control point that is determined by any of the subdivisions; B-Spline surface, Loop subdivision using a triangular mesh, and Catmull-Clark subdivision or Doo-Sabin subdivision using a quadrilateral mesh.

18. The interpolation processing device according to claim 10, comprising a program or a circuit configuration for defining the curve by the control point that is determined by either of Chaikin subdivision and B-Spline curve.

19. A non-transitory program medium storing a program that incorporates following geometric algorithms, for allowing a CPU to execute operations of an interpolation processing method for interpolating a point group by a curve or a surface defined by a control point, providing the point group as an initial control point, the interpolation processing method comprising,
a first interpolation step for performing a geometric algorithm operation for obtaining a point on the curve or the surface as a neighboring point, being located adjacent to the initial control point of a control polygon, and
a second interpolation step for performing a geometric algorithm operation for effecting a shift of the control point from a position of the control point, in a normal direction of the curve or surface at the neighboring point, by a distance between the neighboring point and the initial control point, and defining a position after the shift as a new position of the control point, the control point is renewed one after another by the first interpolation step and the second interpolation step.

20. The non-transitory program medium according to claim 19, the medium storing a program for allowing a CPU to execute the first interpolation step, for obtaining a point on the curve or the surface as the neighboring point, which is located at the shortest distance from the initial control point, according to the geometric algorithm operation.

21. The non-transitory program medium according to claim 19, the medium storing a program for allowing a CPU to execute the first interpolation step, for obtaining as the neighboring point, a midpoint on the curve, or a center point or a centroid within an area defined on the surface, according to the geometric algorithm operation.

22. The non-transitory program medium according to claim 19 the medium storing a program for allowing a CPU to execute;
a geometric algorithm operation in the first interpolation step, for dropping a perpendicular line from the initial control point to the curve or the surface defined by the control polygon, and assuming that a position of a perpendicular foot on the curve or on the surface as the neighboring point, and a geometric algorithm operation in the second interpolation step, for obtaining a distance between the perpendicular foot and the initial control point, assuming a direction of the perpendicular line as a normal direction, shifting by the distance, the control point defining the curve or the surface at the present time in the normal direction from the curve or the surface, and defining a position after shifting as a new position of the control point.

23. The non-transitory program medium according to claim 19, the medium storing a program for allowing the CPU to execute the following steps;

the curve or the surface is obtained based on the control point acquired in the operations, a distance between an interpolation point being the initial control point and the curve or the surface being obtained is compared with a threshold, and the first interpolation step and the second interpolation step are iteratively executed until the distance satisfies the threshold or becomes smaller than the threshold.

24. The non-transitory program medium according to claim 23, the medium storing a program for allowing the CPU to calculate a distance to be compared with the threshold, the distance being an average squared distance or a maximum squared distance of the distance between a perpendicular foot at each initial control point and the interpolation point being an initial control polygon.

25. The non-transitory program medium according to claim 19, the medium storing a program for allowing the CPU to execute the following; in the first interpolation step and the second interpolation step for the first time, the geometric algorithm operations are performed, assuming the point group as an initial control polygon and assuming the initial control polygon as the control polygon, and from the second time of the first interpolation step and the second interpolation step, the geometric algorithm operations are performed, assuming the control point obtained by the interpolation steps as the control polygon.

26. The non-transitory program medium according to claim 19, the medium storing a program for allowing the CPU to execute a processing, based on the surface defined by the control point that is determined by any of the subdivisions; B-Spline surface, Loop subdivision using a triangular mesh, and Catmull-Clark subdivision or Doo-Sabin subdivision using a quadrilateral mesh.

27. The non-transitory program medium according to claim 19, the medium storing a program for allowing the CPU to execute a processing, based on the curve defined by the control point that is determined by either of Chaikin subdivision and B-Spline curve.

* * * * *